United States Patent
Hoshida et al.

(10) Patent No.: US 8,649,678 B2
(45) Date of Patent: Feb. 11, 2014

(54) FRAME PROCESSING APPARATUS, OPTICAL RECEIVING APPARATUS, OPTICAL TRANSCEIVING APPARATUS, OPTICAL TRANSMISSION SYSTEM, AND FRAME PROCESSING CONTROLLING METHOD

(75) Inventors: Takeshi Hoshida, Kawasaki (JP); Katsumi Fukumitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 630 days.

(21) Appl. No.: 12/488,745

(22) Filed: Jun. 22, 2009

(65) Prior Publication Data

US 2010/0027988 A1 Feb. 4, 2010

(30) Foreign Application Priority Data

Jul. 31, 2008 (JP) ................................. 2008-198540

(51) Int. Cl.
*H04B 10/08* (2006.01)
(52) U.S. Cl.
USPC .................................. 398/27; 398/17; 398/19
(58) Field of Classification Search
USPC ................ 398/1–6, 10–12, 17–19, 26–28, 33
See application file for complete search history.

(56) References Cited

U.S. PATENT DOCUMENTS

| | | | |
|---|---|---|---|
| 5,760,937 A | 6/1998 | Ishikawa et al. | |
| 6,396,601 B1 | 5/2002 | Takara et al. | |
| 6,587,986 B1 | 7/2003 | Kanazawa et al. | |
| 6,735,735 B1 | 5/2004 | Ohira et al. | |
| 2004/0218919 A1* | 11/2004 | Hunsche et al. | 398/27 |
| 2006/0080581 A1 | 4/2006 | Ono | |
| 2006/0184860 A1* | 8/2006 | Takagi | 714/774 |
| 2010/0239247 A1* | 9/2010 | Kani et al. | 398/41 |
| 2011/0158648 A1* | 6/2011 | Kubo et al. | 398/48 |

FOREIGN PATENT DOCUMENTS

| | | |
|---|---|---|
| JP | 6-302085 | 10/1994 |
| JP | 8-321805 | 12/1996 |
| JP | 11-223575 | 8/1999 |
| JP | 2000-196467 | 7/2000 |
| JP | 2001-24522 | 1/2001 |
| JP | 2003-273841 | 9/2003 |
| JP | 2006-332920 | 12/2006 |
| WO | WO2005/013542 | 2/2005 |

OTHER PUBLICATIONS

Japanese Notice of Rejection mailed Dec. 4, 2012, issued in corresponding Japanese Patent Application No. 2008-198540.
Japanese Office Action issued Jun. 25, 2013 in corresponding Japanese Application No. 2008-198540.

* cited by examiner

*Primary Examiner* — Dzung Tran
(74) *Attorney, Agent, or Firm* — Staas & Halsey LLP

(57) ABSTRACT

The technique for improving the efficiency in use of power resources while maintaining the received signal quality that satisfies the requirement during a system operation is disclosed. The frame processing apparatus disclosed in the present case includes: a frame processing unit which performs frame processing on an input signal in the designated error processing mode; and a controlling unit which receives the monitoring result relating to the signal quality of the input signal and performs switching control of the designation of the above error processing mode in the frame processing unit based on the received monitoring result.

16 Claims, 13 Drawing Sheets

FIG. 4

| ERROR CORRECTION SCHEME | BER UPPER BOUNDARY BEFORE CORRECTION (BER_UB) | BER LOWER BOUNDARY BEFORE CORRECTION (BER_LB) |
|---|---|---|
| NO CORRECTION | 1e-15 | N/A |
| CORRECTION SCHEME 1 | 1e-9 | 1e-16 |
| CORRECTION SCHEME 2 | N/A | 1e-10 |

# FRAME PROCESSING APPARATUS, OPTICAL RECEIVING APPARATUS, OPTICAL TRANSCEIVING APPARATUS, OPTICAL TRANSMISSION SYSTEM, AND FRAME PROCESSING CONTROLLING METHOD

CROSS-REFERENCE TO RELATED APPLICATION(S)

This application is based upon and claims the benefit of priority of the prior Japanese Patent Application No. 2008-198540, filed on Jul. 31, 2008 in Japan, the entire contents of which are incorporated herein by reference.

FIELD

The present invention relates to a frame processing apparatus, an optical receiving apparatus, an optical transceiving apparatus, an optical transmission system, and a frame processing controlling method.

BACKGROUND

As technology for supporting speeding up of information communications and long-distance transmission paths, error correction processing is well known. The error correction processing applies error correction codes in order to correct bit errors with respect to a signal that is transmitted through a transmission path and received at the reception terminal. The necessity of error correction processing is heightened by the fact that the ability of the element(s) constituting the reception apparatus that receives a signal affects the received signal quality. Recently, with speeding up and enlargement of the capacity of information transmission by means of optical communications, the requirements for the received signal quality become severe, and the ability of error correction processing is required to be improved.

Then, the circuit module such as LSI (Large Scale Integration) that carries out such error correction processing is required to perform further complex arithmetic operations accompanying the improvement of the correction processing ability. Because of this, the circuit module of the error correction processing has a tendency such that the larger the gate scale, the larger the power consumption.

Here, the transmission path applied to an information communications system has factors that vary the transmission characteristics in its operation, and such variation factors affect the received signal quality. The paths transmitting wavelength multiplexed optical signals therethrough are not exceptions.

For example, the wavelength dispersion characteristic varies depending on the temperature state, which affects the received signal quality at the reception terminal. Further, in the wavelength multiplexed signal, an optical signal at one wavelength is affected by the non-linear effects such as mutual cross phase modulation or the like with an optical signal at another wavelength. Further, the variations in temperature in the room in which an optical reception apparatus is installed also affect the received signal quality.

(Patent Document 1) Japanese Patent Application Publication No. 2006-332920

(Paten document 2) Japanese Patent Application Publication No. HEI 6-302085

SUMMARY

As an example, the following means are used.

(1) As a generic feature, there provided is a frame processing apparatus, including: a frame processing unit which performs frame processing of an input signal under a designated error processing mode; and a controlling unit which receives a monitoring result relating to signal quality of the input signal, and performs switching control that switches designation of the error processing modes under which the frame processing is performed in the frame processing unit, based on the received monitoring result.

(2) As another generic feature, there provided is an optical receiving apparatus, including: an optical receiving unit which receives an incoming optical signal and outputs the signal as an electric signal; a frame processing unit which performs frame processing of an input signal from the optical receiving unit under a designated error processing mode; and a controlling unit which receives a monitoring result relating to signal quality of the input signal and performs switching control that switches designation of the error processing modes, under which the frame processing is performed by the frame processing unit, based on the received monitoring result.

(3) As yet another generic feature, there provided is an optical transceiving apparatus, including: an optical transmitter which sends an optical signal; and an optical receiver which receives an optical signal, the optical receiver including: an optical receiving unit which receives an incoming optical signal and outputs the signal as an electric signal; a frame processing unit which performs frame processing of an input signal from the optical receiving unit under a designated error processing mode; and a controlling unit which receives a monitoring result relating to signal quality of the input signal, and performs switching control that switches designation of the error processing modes, under which the frame processing is performed by the frame processing unit, based on the received monitoring result.

(4) As still another generic feature there provided is An optical transmission system, including: an optical transmitter including: a transmission end frame processing unit which performs transmission end frame processing under a transmission end error processing mode designated with respect to incoming data traffic; and an optical transmission unit which converts an output signal from the transmission end frame processing unit into an optical signal and sends the optical signal; and an optical receiver which receives an optical signal sent from the optical transmission unit, the optical receiver including: an optical receiving unit which receives an incoming optical signal and outputs the signal as an electric signal; a reception end frame processing unit which performs reception end frame processing of an input signal from the optical receiving unit under a designated reception end error processing mode; and a reception controlling unit which receives a monitoring result relating to signal quality of the input signal, and performs switching control that switches designation of the reception end error processing modes, under which the reception end frame processing is performed by the frame processing unit, based on the received monitoring result, and sends control information relating to designation of the reception end processing mode, the optical transmitter including: a transmission controlling unit which performs switching control that switches the designation of the transmission end error processing modes, under which the frame processing is performed by the transmission end frame processing unit, based on the control information from the reception controlling unit.

(5) As a further generic feature, there provided is a controlling method of frame processing which performs frame processing including error processing of an input signal, the method including: receiving a monitoring result relating to signal quality of the input signal; and performing switching control that switches operation modes, under which error correction processing in the error processing is performed, based on the monitoring result relating to the number of bit errors received.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 4 is a table for describing a function according to the first embodiment;

DESCRIPTION OF THE PREFERRED EMBODIMENT(S)

Figure 1:
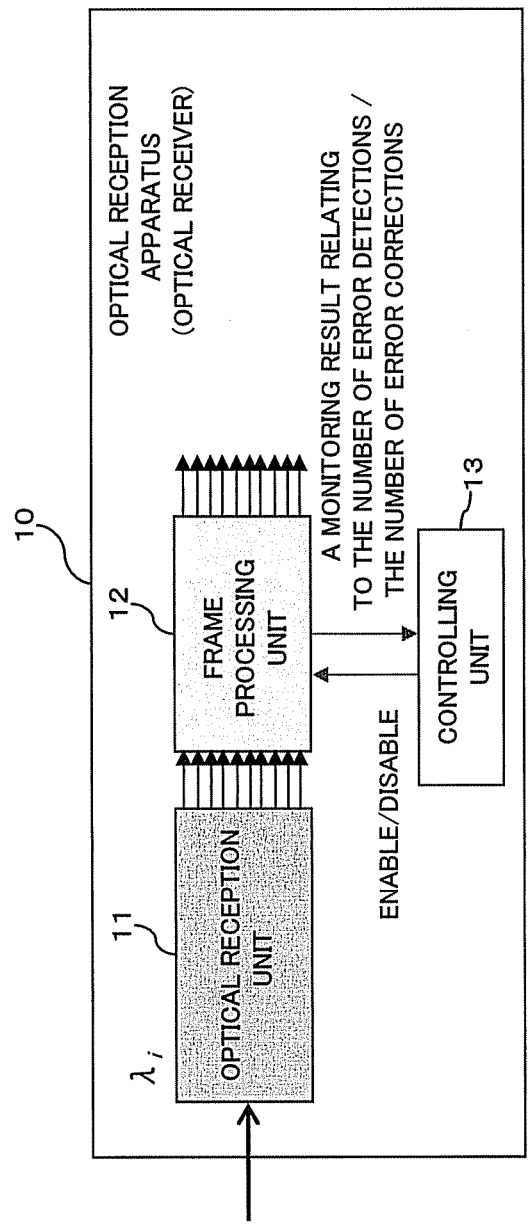
FIG. 1 is a diagram illustrating an optical receiving apparatus according to a first embodiment.

Referring to the drawings, a description will be made hereinafter of preferred embodiments of the present invention. Here, the embodiments described below are merely examples, and there is no intention to exclude application of various types of modifications or techniques not explicitly described in the following descriptions. That is, the present embodiment should by no means be limited to the illustrated embodiments below, and various changes or modifications (combination of practical examples, or the like) may be suggested without departing from the gist of the invention.

[A] First Embodiment

FIG. 1 is a diagram illustrating an optical reception apparatus 10 according to a first embodiment. The optical reception apparatus 10 depicted in FIG. 1 is applicable to, for example, an optical receiver 5 constituting optical transceivers 8A and 8B in an optical transmission system 1 illustrated in FIG. 2. Here, in the optical transmission system 1 depicted in FIG. 2, a transmission path fiber 2a and an optical relay amplifier 2b are mutually connected, and one or more optical transmission apparatuses 3, which perform optical add-drop multiplexing and wavelength cross connect, are arranged on the transmission path fiber 2a.

The optical transceivers 8A and 8B, each including an optical transmitter 4 and an optical receiver 5, are coupled to the optical transmission apparatuses 3 and bi-directionally send and receive optical signals by way of the above described optical transmission apparatuses 3, the transmission path fiber 2a, and the optical relay amplifier 2b. The following description will be made with an attention paid to, in particular, transmission of an optical signal transmitted from the optical transmitter 4 of the optical transceiver 8A to the optical receiver 5 of the optical transceiver 8B, but the similar description can also be made about an optical signal transmission in the opposite direction thereto.

In this instance, an optical signal sent from the optical transmitter 4 has an allocated optical wavelength of $\lambda i$ to one channel forming multiplexed wavelengths. For example, the optical signal is wavelength-multiplexed with an optical signal of another channel by the wavelength multiplexer 6, and then transmitted through the transmission path fiber 2a by way of the optical transmission apparatus 3. Further, as an example, upon input of the wavelength multiplexed optical signal from the optical transmission apparatus 3 to the wavelength demultiplexer 7, the multiplexed optical signal is divided into optical signals of individual channels. The optical receiver 5 in FIG. 2 receives an optical signal at the allocated light wavelength of $\lambda i$. This makes it possible for the optical receiver 5 to receive the optical signals from the optical transmitter 4.

Here, the optical transmitter 4 includes a transmission end frame processing unit (or apparatus, hereinafter referred to "apparatus") 4a and an optical transmitting unit 4b. The transmission end frame processing unit 4a performs transmission end frame processing such as coding of a data stream for transmission with an error correction code. Further, the optical transmitting unit 4b converts the signal coded by transmission end frame processing performed on the transmission end frame processing apparatus 4a into an optical signal, and the converted optical signal is sent toward the optical receiver 5.

On the other hand, the optical receiver 5 has an optical receiving unit 5a and an reception end frame processing unit 5b. The optical receiving unit 5a receives an optical signal $\lambda i$ from the optical transmitter 4, converts the received optical signal $\lambda i$ into an electric signal, and outputs the electric signal to the reception end frame processing unit 5b. The reception end frame processing apparatus 5b performs reception end processing including error correction processing serving as frame synchronization processing and/or in-frame processing on a received electric signal from the optical receiving unit 5a. The reception end frame processing apparatus 5b performs this error correction processing, thereby correcting bit errors occurring in the transmission process of the optical signal.

Figure 2:
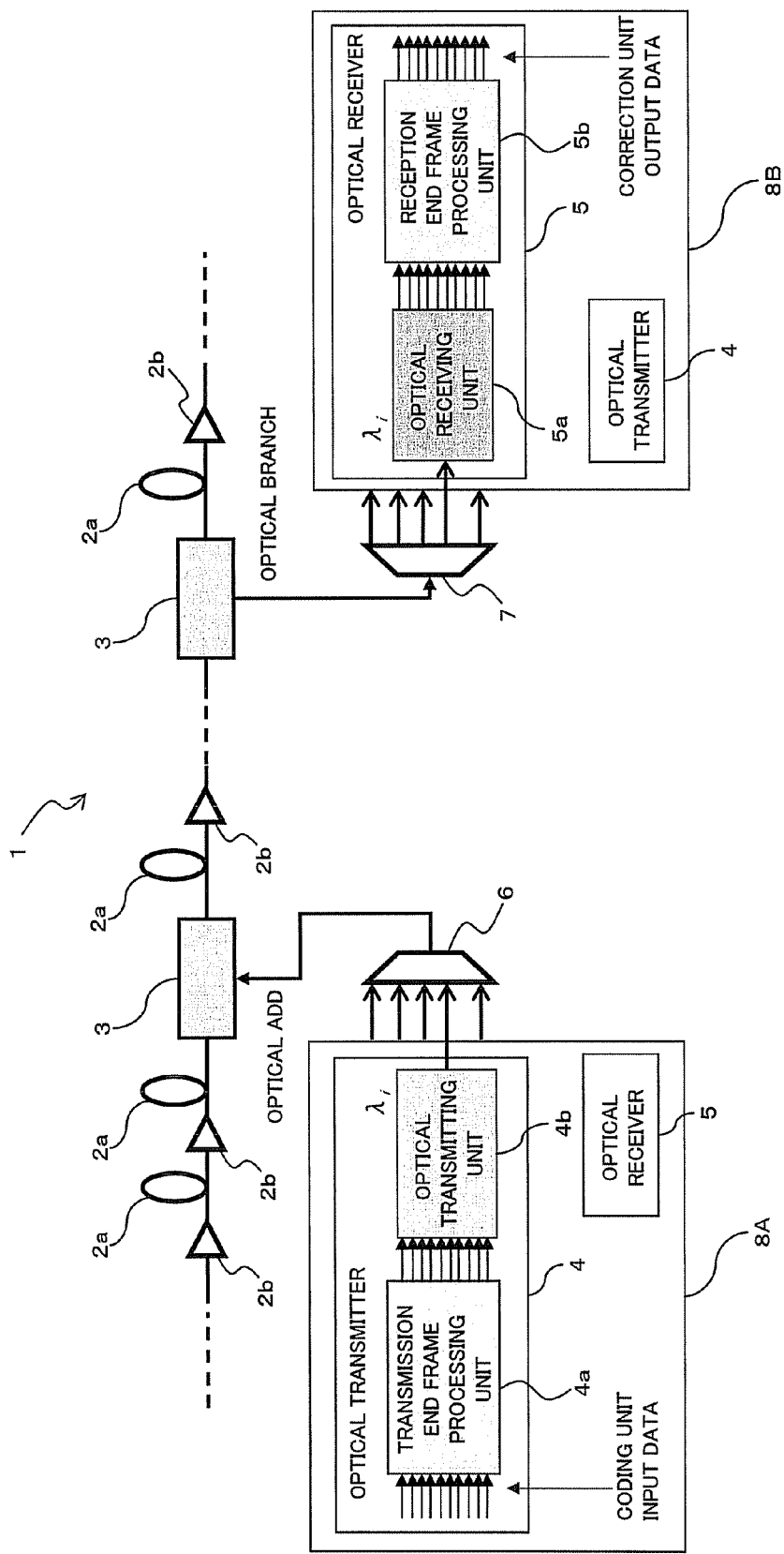
FIG. 2 is a diagram illustrating an example of an optical transmission system to which the optical reception apparatus depicted in FIG. 1 is applied.

The optical reception apparatus 10 according to the first embodiment is available as the above described optical receiver 5 depicted in FIG. 2. The optical reception apparatus 10 includes: an optical reception unit 11; a frame processing unit (frame processing apparatus) 12; and a controlling unit 13. The optical reception unit 11 is equivalent to the optical receiving unit 5a depicted in FIG. 2, and is an example of an optical reception unit that receives an input optical signal and then outputs the received signal in the form of an electric signal. Further, the frame processing unit 12 and the controlling unit 13, which controls the frame processing unit 12, are equivalent to the reception end frame processing unit 5b illustrated in FIG. 2. Cooperatively operating of the frame processing unit 12 and the controlling unit 13 realizes frame processing to an input signal under a designated error processing mode.

Further, the frame processing unit (reception end frame processing unit) 12, which is equivalent to the reception end frame processing unit 5b depicted in FIG. 2 in cooperation with the controlling unit 13, performs reception end frame processing to a received electric signal from the optical reception unit 11. This frame processing unit 12 can be provided as a synchronous circuit module that performs signal processing in synchronization with a supplied clock signal.

Here, the frame processing unit 12 in the optical reception apparatus 10 according to the first embodiment performs frame processing of a received electric signal, which is an input signal from the optical reception unit 11, in a designated error processing mode under control by the controlling unit 13 to be detailed below. More specifically, the frame processing unit 12 performs frame processing including error processing in any of the error processing modes different in error correction ability, as an operation mode at the time the frame processing is performed. The error processing includes: processing that performs error detection without execution of error correction itself; and processing that performs error correction together with error detection.

Further, the frame processing unit 12 outputs to the controlling unit 13 information relating to the number of bit errors, which have been detected or subjected to error correction at the time of the above frame processing performed. The controlling unit 13 is an example of a controlling unit which receives a monitoring result relating to the signal quality of a signal input to the frame processing unit 12, and then performs switching control of designation of error processing modes in the frame processing unit 12 based on the received monitoring.

That is, the controlling unit 13 receives a monitoring result relating to the number of bit errors that are detected or corrected at the frame processing performed in the frame processing unit 12 as a monitoring result relating to the signal quality, and performs switching control that switches designation of the error processing modes for the frame processing unit 12, based on the received monitoring result.

As designation of an error processing mode, one of the error processing modes can be designated. Then, the error processing modes that can be designated may include two or more processing modes, under which error correction processing is performed, different in error correction ability. Further, the above mentioned processing mode may include a processing mode, under which only error detection is performed without executing error correction.

As an example, the frame processing unit 12 according to the first embodiment supplies the controlling unit 13 with the number of bit errors, as the monitoring result relating to the number of the bit errors described above. Still further, as a monitoring result relating to the number of bit errors, it is also possible to supply the controlling unit 13 with a bit error rate, a symbol error rate, Q value, the number of average bit errors per unit time, an average bit error rate per unit time, average symbol error rate per unit time, or the like.

With the above arrangements, it is still possible for the controlling unit 13 to receive a monitoring result relating to the bit errors mentioned above and then to perform on the basis of the received monitoring result switching control that switches designation of the error processing modes used in the frame processing unit 12.

The controlling unit 13 of the first embodiment derives an error occurrence rate per unit time from the number of bit errors input from the frame processing unit 12. The unit measuring time for deriving an error occurrence rate can be, for example, measuring time long enough to capture the variation in temperature of the transmission path fiber (see reference character 2a in FIG. 2) which measuring time 3 is a factor in conjunction with a variation in received signal characteristics. On the basis of the derived error occurrence rate, the controlling unit 13 can perform control to designate one from two or more error processing modes.

Figure 3:
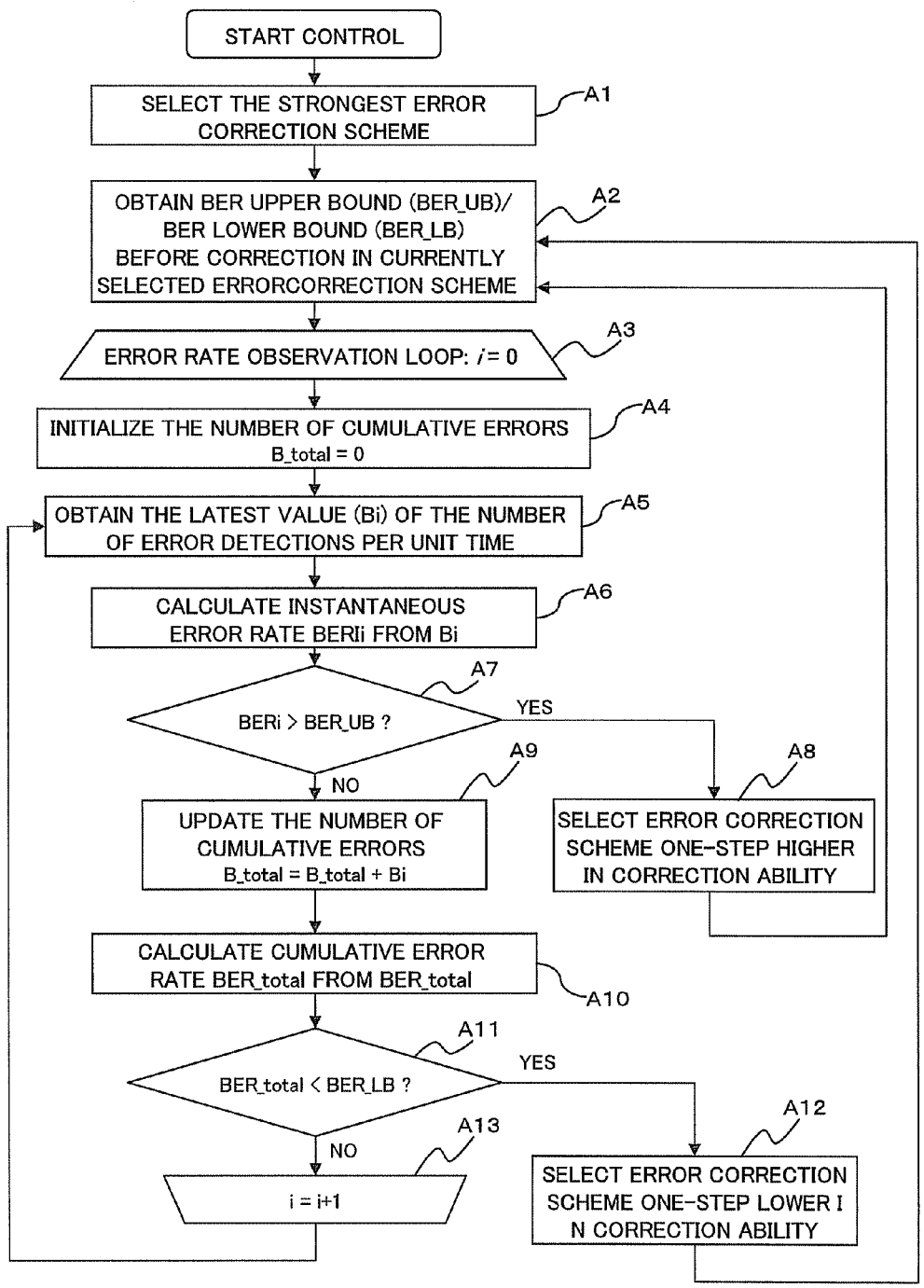
FIG. 3 is a flowchart for describing an operation performed in the first embodiment.

FIG. 3 is a flowchart describing an example of switching control of the designation of error processing modes in the controlling unit 13. The controlling unit 13 controls the frame processing unit 12 and designates the default error processing mode (error correction scheme) (step A1). The frame processing unit 12 can select, as the default error processing mode, the strongest error processing mode (i.e., with the highest error correction ability) among a number of error processing modes.

The controlling unit 13 obtains information of a range of error rates at which the quality of a received signal with respect to the selected error processing mode can be kept at a required level thereof (that is, the value of the upper bound error rate BER_UB and the value of the lower bound error rate BER_LB) from a storage unit or the like under control of the controlling unit 13 (step A2). Here, for example, the upper bound error rate BER_UB is associated with the threshold value which is necessary for an error processing mode to be switched into the one that is higher in correction ability for the purpose of securing the required reception signal quality. The lower bound error rate BER_UB, for example, is associated with the threshold value BER_LB which can secure the reception signal quality even when the error correction ability is switched into a lower quality.

In this instance, as described above, the controlling unit 13 uses, for example, a storage unit or the like under control thereof to manage the values of the upper bound error rate BER_UB and the lower bound error rate BER_LB for each of the error processing modes in accordance with the correction abilities. FIG. 4 is a table indicating an example of the values of the upper error rates BER_UB and the lower error rates BER_LB according to the three types of error processing mode (error correction schemes). In this instance, in FIG. 4, the correction ability is improved in the following order: "without correction", "correction scheme 1", and "correction scheme 2".

As described in FIG. 3, the frame processing unit 12 starts frame processing, including error correction processing, based on the error processing mode designated by default, as described above. At that time, in the controlling unit 13, the value of the number of cumulative errors is initialized (B_total=0), and the process then gets into an error rate measuring loop (step A3 and step A4).

That is, the controlling unit 13 obtains information relating to the number Bi of bit errors per unit measuring time having been subjected to detection and error correction at the time of frame processing performed in the frame processing unit 12, from the frame processing unit 12 (step A5). The controlling unit 13 induces an error generation rate (momentary error rate) BERi per unit measuring time described above by use of the number Bi of bit errors received from the frame processing unit 12 (step A6).

In a case where the thus obtained error occurrence rate BERi is larger than the upper bound error rate BER_UB, the controlling unit 13 switches the designation of error processing mode one-step higher in correction ability (from YES route of step A7 to step A8). Further, in a case where BERi is not higher than the upper bound error rate BER_UB, the controlling unit 13 updates the number (B_total) of cumulative errors up to the time point by adding the obtained Bi (B_total=B_total+Bi: from NO route of step A7 to step A9). After that, the controlling unit 13 calculates the cumulative error rate BER_total up to the time point from the number B_total of cumulative errors having been updated (step A10).

Subsequently, the controlling unit 13 compares the thus calculated cumulative error rate BER_total with the lower bound error rate BER_LB up to the time point from (step A11). Here, in a case where the cumulative error rate BER_total is not lower than the lower bound rate BER_LB, the processing returns to the process of receiving the number of errors from the frame processing unit 12 with no change of the error processing mode (from NO route of step A11 to step A13 and step A5).

On the other hand, in a case where the cumulative error rate BER_total is lower than the lower bound rate BER_LB, the controlling unit 13 switches the designation of the error processing mode into the one with the one-step lower in correction ability (from YES route of step A11 to step A12). That is, even if the controlling unit 13 switches the designation of the error processing mode into another error processing mode with a lower error correction ability, when it is still possible to obtain the sufficient received signal quality required, the controlling unit 13 switches the error processing mode into the one lower in correction ability. In a case of an operation mode with lower correction processing ability, load caused by arithmetic processing tends to be lower as compared to an operation mode with higher correction ability. The controlling unit 13 reduces the number of gates used in a circuit module, thereby making it possible to suppress the power consumption.

In this instance, in a case where the error processing mode is changed to the one with a higher ability or to the one with a lower ability (step A8 and step A12), the controlling unit 13 obtains information on a range of the error rates associated with the changed error processing mode (that is, the values of the upper bound error rate BER_UB and the lower bound error rate BER_LB) in a similar manner (as step A2). Thereafter, the controlling unit 13 is allowed to continue the similar measuring of error rates.

In this manner, when the processing mode is switched from the one with a relatively low correction ability into the one with a relatively high correction ability, switching response thereof needs to be relatively high speed, in order that effects of the quality of the received signal due to variation of propagation path state are excluded. In contrast to this, when the processing mode is switched from the one with a relatively high correction ability into the one with a relatively low correction ability, the switching response thereof can be relatively low from the viewpoint of maintaining a stable circuit operation together with reception signal quality.

Further, as an example, the following is a case where frame processing is performed in either of the two types of the first and the second error processing modes in the frame processing unit 12. Here, the first error processing mode can be a mode in which error correction processing based on a specific error correction code used in the transmission end frame processing unit 4a of the optical transmitter 4. Yet further, the second error processing mode can be a mode in which only error detection is performed without performing error correction processing (mode in which error correction processing is disabled).

In this case, the frame processing is performed in the first error processing mode by default. The controlling unit 13 induces an error rate (BERi) per unit measuring time from the number of errors received when the controlling unit 13 is performing frame processing in the first error processing mode. When the cumulative BERi obtained from the induced error rate corresponding to the fine received signal quality to the extent such that the required received signal quality can be obtained even if the designation of the operation mode is switched to the second error processing mode, the controlling unit 13 switches the operation mode in the frame processing unit 12 into the second error processing mode.

As described, the error processing mode for the frame processing to the input signal is switched from the first error processing mode to the second error processing mode. In this instance, when the optical transmitter 4 (see FIG. 2) performs error correction coding by use of a block code, an arithmetic operation with respect to a redundant bit accompanied by y the above described coding can be simply skipped in the second error processing mode. That is, a payload can be output as it is without performing an arithmetic operation with respect to a redundant bit (overhead) for error correction. This makes it possible to suppress increase in consumption power in the case of the optical transmission path state in which fine signal quality can be obtained.

In this instance, the controlling unit 13 can induce the variation tendency of the error rate from transition of the error rate BERi measured per unit measuring time. This makes it possible to switch the operation mode from the one with a low error correction ability to the one with a high error correction ability without delay in a case where the error rate indicates a tendency to increase.

Further, the number of errors to be detected by the frame processing unit 12 can be detected by use of information based on the error correction coding processing performed on the transmission end or by use of another scheme. The detection can be performed by means of detecting the number of bit errors using the parity check scheme regulated by such protocols as Synchronous Digital Hierarchy (SDH), Synchronous Optical Network (SONET), and Optical Transport Network (OTN).

In this manner, according to the first embodiment, it is possible to switch error processing modes according to the error rate (signal quality) of the received signal during a system operation, so that it becomes also possible to improve the efficiency of the use of power sources while securing the received signal quality satisfying a demand.

[B] Second Embodiment

Figure 5:
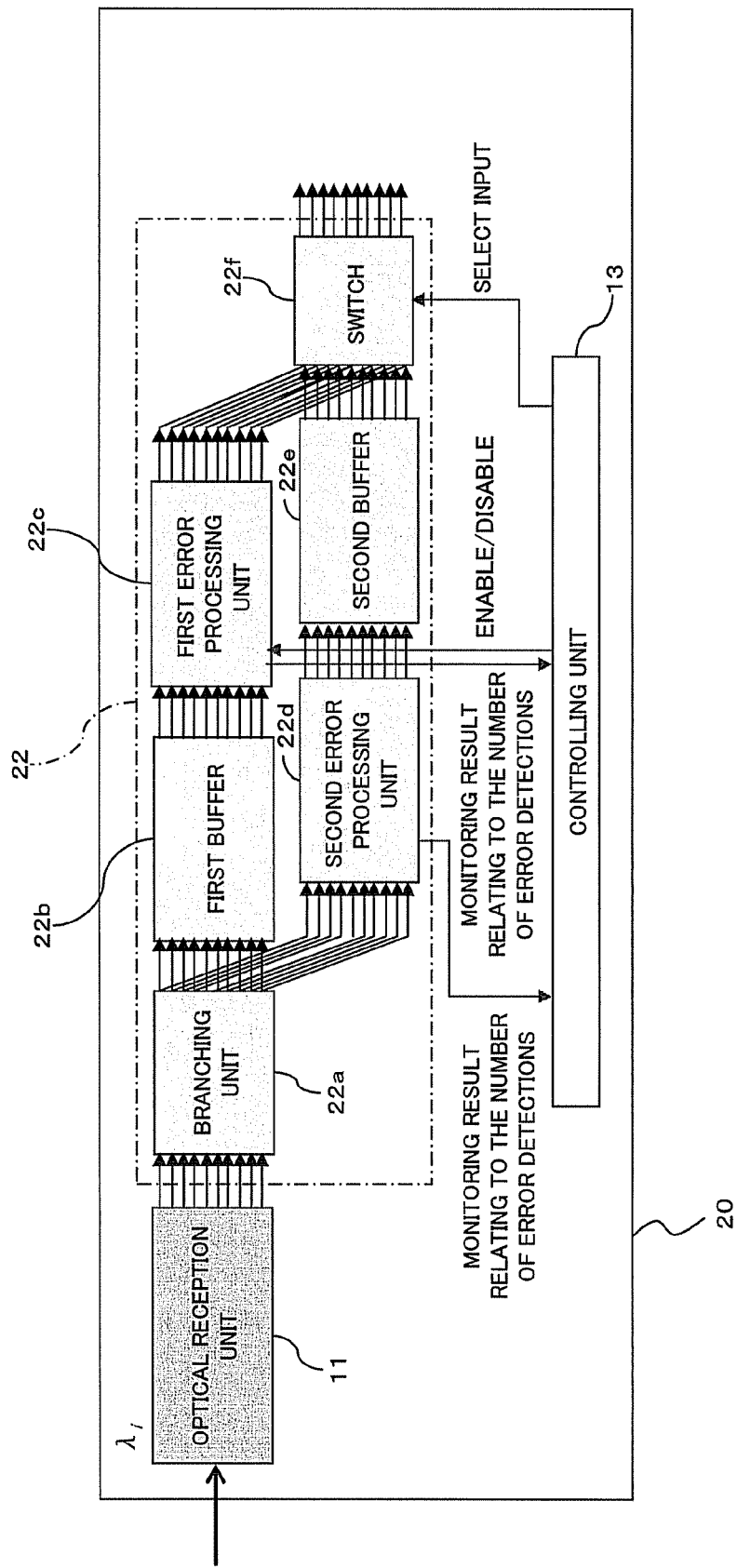
FIG. 5 is a diagram illustrating an optical receiver according to a second embodiment.

FIG. 5 is a diagram illustrating an optical reception apparatus 20 according to a second embodiment. The optical reception apparatus 20 illustrated in FIG. 5 is applicable to, for example, an optical receiver 5 in the optical transmission system 1 illustrated in FIG. 2. Here, the optical reception apparatus 20 includes not only the optical reception unit 11 and the controlling unit 13 similar to the above described first embodiment (see FIG. 1) but also a frame processing unit 22. The reception end frame processing unit (see reference character 5*b* of FIG. 2) includes a controlling unit 13 and the frame processing unit 22.

Further, the frame processing unit 22, which corresponds to one mode of the frame processing unit 12 according to the above described first embodiment, performs reception end frame processing including frame synchronization processing and in-frame processing such as error correction processing based on setting of the operation mode performed by the controlling unit 13. In this instance, FIG. 5 illustrates a branching unit 22*a*, a first buffer 22*b*, a first error processing unit 22*c*, a second error processing unit 22*d*, a second buffer 22*e*, and a switch 22*f*, as a part of the elements of frame processing unit 22.

The branching unit 22*a* bifurcates the input signal (received electric signal) from the optical reception unit 11. When the input signal from the optical reception unit 11 is a parallel signal, the branching unit 22*a* bifurcates each parallel signal sequence.

Further, the first buffer 22*b*, which is interposed between the branching unit 22*a* and the first error processing unit 22*c*, holds either of the signals bifurcated by the branching unit 22*a* for a first holding time duration, which will be described later, and outputs the held signal to the first error processing unit 22*c*. In other words, the first buffer 22*b* is an input-end buffer to which either of the signals bifurcated by the branching unit 22*a* is introduced.

The first error processing unit 22*c*, which is coupled to a path to which a signal is output to the first buffer 22*b*, performs error processing in an error processing mode with an error correction ability different from that of the second error processing unit 22*d*, which will be described later. Here, the first error processing unit 22*c* is an error correction circuit (error correction unit) that performs error correction processing along with bit error detection with respect to either of the signals bifurcated by the branching unit 22*a*.

Further, the second error processing unit 22*d* is an error detection circuit that detects a bit error with respect of the other of the signals bifurcated by the branching unit 22*a*. In this instance, the second error processing unit 22*d* detects bit errors with respect to the input signal and outputs the signal without correcting the detected bit errors. The second error processing unit 22*d* may operate in the error processing mode same as the first error processing unit 22*c*, but may perform error processing in the processing mode with the lowest error correction ability if possible. This brings about a possibility of further reducing power consumption.

Further, the second buffer 22*e*, which is interposed between the second error processing unit 22*d* and the switch 22*f* in the subsequent stage, is input thereto with a signal from the second error processing unit 22*d*, that is, a bifurcated signal on which no error correction is made, and holds the input signal for a second holding time duration, which will be described later, outputs the signal to the switch 22*f*. The switch 22*f* selectively outputs either the signal (errors therein have been corrected) output from the first error processing unit 22*c* or the signal (errors therein have not been corrected) from the second buffer 22*e*.

The controlling unit 13 controls a signal route which is output by the switch 22*f* together with enabling/disabling with respect to the first and the second error processing units 22*c*, 22*d*. That is, the controlling unit 13 performs control in such a manner that either of the first and the second error processing units 22*c*, 22*d* is enabled based on a monitoring result relating to the number of bit errors having been subjected to detection or error correction processing performed by the error processing unit that is enabled, of the first or the second error processing units 22*c*, 22*d*. On the other hand, the controlling unit 13 performs control in such a manner that the remaining error processing unit is disabled. Further, the controlling unit 13 performs switching control in such a manner that the signal output by the switch 22*f* is a signal from the above described one that is controlled to be enabled.

For example, assuming that the first error processing unit 22*c* is controlled to be enabled and the second error processing unit 22*d* is controlled to be disabled, the switch 22*f* under control of the controlling unit 13 outputs a signal having been subjected to error correction performed by the first error processing unit 22*c*. At that time, the controlling unit 13 receives from the first error processing unit 22*c* information relating to the number of bit errors having been subjected to detection or error correction performed by the first error processing unit 22*c* that is enabled.

Similar to the first embodiment, the controlling unit 13 induces (calculates) an error rate (error occurrence rate) from received information relating to the bit errors. In a case where the induced error rate is an error rate which can secure the required received signal quality even without performing error correction thereon, the controlling unit 13 performs switching control that switches the designation of the error processing mode into the second error processing mode.

That is, the controlling unit 13 switches the first error processing unit 22*c* from an enable state thereof into a disabled state thereof, while the controlling unit 13 performs control such that the second error processing unit 22*d* is switched from a disable state thereof into a enable state thereof. The second error processing unit 22*d*, which does not perform error correction processing, is lower in power consumption than the first error processing unit 22*c*, which performs the error correction processing. Because of this, under a situation where the transmission path characteristic or the like is fine enough to omit error correction in the second error processing unit 22*d* performs error processing, thereby efficiently utilizing power sources.

On the other hand, if the induced error rate is an error rate in which error correction processing is necessary for securing the required received signal quality, the controlling unit 13 performs switching control in such a manner that the designation of the error processing mode is switched into the first error processing mode. That is, when the first error processing unit 22*c* has been enabled, the enable state is maintained, and the controlling unit 13 performs switching control in such a manner that the designation of the error processing mode is switched into a disable state.

In the meanwhile, a variation of a state of propagation path characteristic may turn the received signal which has not required error correction turns to require error correction. In this case, on the basis of the switching control performed by the controlling unit 13, control is performed in such a manner that the first error processing unit 22*c* which has been disabled is enabled, and the second error processing unit 22*d* which has been enabled is disabled.

In this instance, as control for disabling the first or the second error processing units 22*c*, 22*d* is realized by halting supply of clock signals or power source to the first or the second error processing units 22*c*, 22*d*, thereby halting control with respect to the entire or a part of the circuit function.

In the instance, the first holding time duration held by the first buffer 22*b* can be defined as a time duration from input of a signal into the second error processing unit 22*d*, and detection of a bit error, to enable/disable controlling from the controlling unit 13 works. That is, the signal corresponding to the frame signal having been subjected to error detection performed by the second error processing unit 22*d* being controlled to be enabled, is held in the first buffer 22*b*, and is then input to the first error processing unit 22*c* after it is switched into an enable state. This makes it possible to avoid momentary break of the output signal of the frame processing unit 22.

Further, the second holding time duration held in the second buffer 22*e* is set to be delay time such that the time durations elapsed until the signals bifurcated by the branching unit 22*a* reach the switch 22*f* become substantially equal. Accordingly, in a case where there is a processing time difference between the first error processing unit 22*c* and the second error processing unit 22*d*, the second holding time duration differs from the first holding time duration in the first buffer 22*b*.

Figure 6:
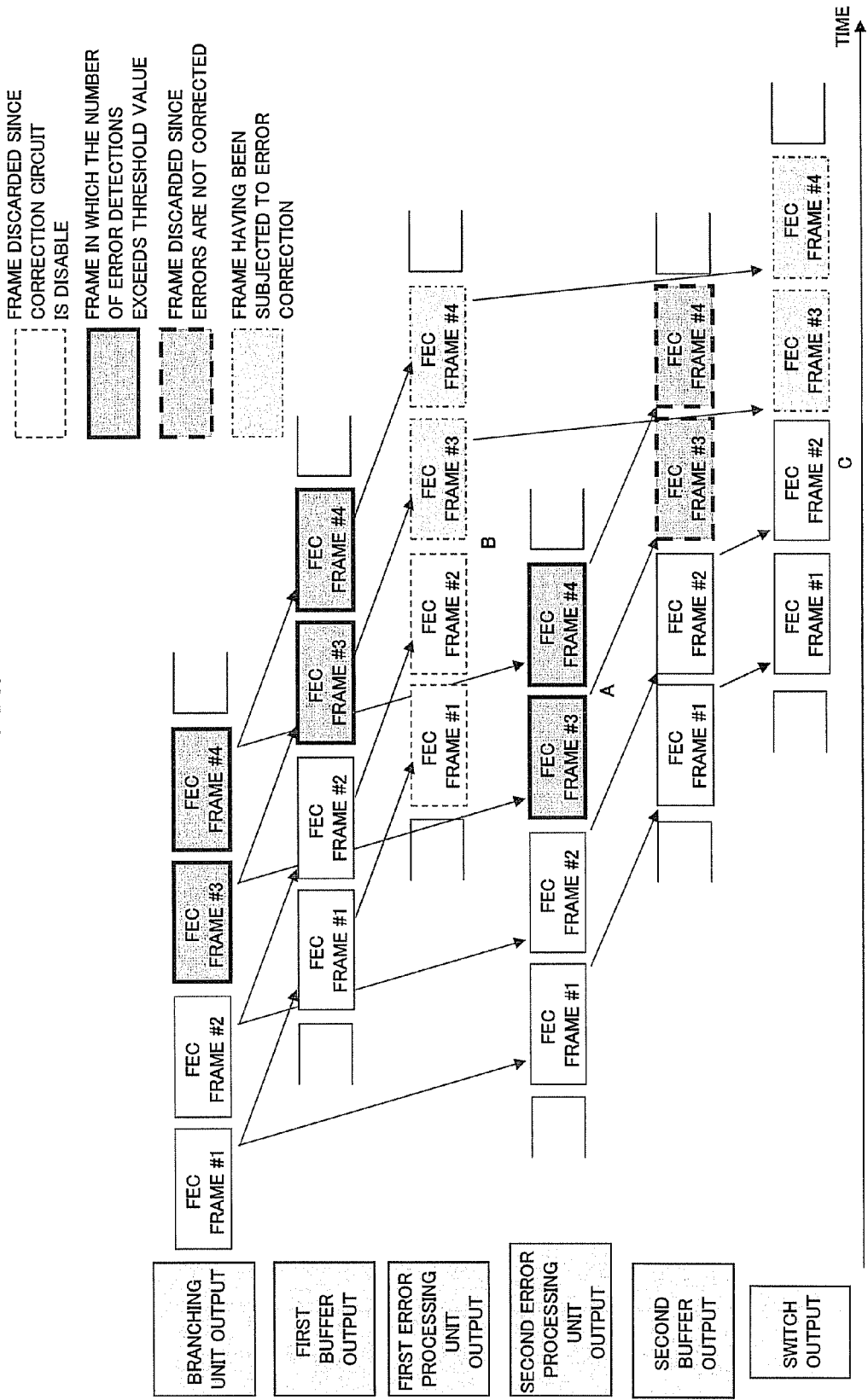
FIG. 6 is a diagram illustrating an operation performed in the optical reception apparatus according to the second embodiment.

FIG. 6 is a description diagram illustrating an example of processing performed in the frame processing unit 22 constituting the optical reception apparatus 20 according to the second embodiment. In this FIG. 6, the branching unit 22*a* outputs the FEC frames (#1 through #4, . . . ) input thereto to the first buffer 22*b* and the second error processing unit 22*d*.

As to the FEC frames #1 and #2, an error rate received from an error processing unit (here, the second error processing unit 22*d*) in an enable state is the one such that the required received signal quality can be attained even if the error correction processing is omitted. In this case, the controlling unit 13 controls the second error processing unit 22*d* and the switch 22*f*, thereby executing controlling for outputting the FEC frames #1 and #2 from the second error processing unit 22*d* by way of the second buffer 22*e* and the switch 22*f*. At that time, in the first error processing unit 22*c* in a disable state, the FEC frames #1 and #2 input by way of the first buffer 22*b* are discarded.

When the FEC frame #3 is input to the second error processing unit 22*d*, also, the number of errors in the FEC frame #3 detected by the second error processing unit 22*d* in an enable state is output to the controlling unit 13. Since the error rate induced from the number of errors detected in the FEC frame #3 by the controlling unit 13 is the one which requires error correction processing, the controlling unit 13 performs switching control in selection of enable/disable of the error processing units 22*c* and 22*d* and the switch 22*f*.

With this arrangement, on the basis of the fact that the number of detected errors (error rate) is increased (see reference character A of FIG. 6), the first error processing unit 22*c* under the above described switching control from the controlling unit 13 switches the operation state to an enable state (see reference character B of FIG. 6). Further, the switch 22*f* under switching control from the controlling unit 13 selectively outputs a signal that has undergone error correction processing from the first error processing unit 22*c* end at selection output timing for the FEC frame #3 (see reference character C in FIG. 6). In this instance, at that time, the first error processing unit 22*c* in a disabled state discards the FEC frame #3 input from the branching unit 22*a* based on disable controlling from the controlling unit 13.

In the FEC frame #4, also, similar to the above described the FEC frame #3, a signal having been subjected to error correction processing from the first error processing unit 22*c* end in an enable state is selectively output from the switch 22*f*.

As described above, on the basis of the number of errors detected or corrected with respect to each FEC frame, the error processing modes in the first and the second error processing units 22*c* and 22*d* are switched. At the time of this switching, as to the FEC frames resulting from the number of detected errors, a signal subjected to error correction processing performed in the error processing mode after switching can be output. That is, when an error rate is deteriorated, as to the deteriorated FEC frame, also, it is possible to output from the switch 22*f* the output of the first error processing unit 22*c*, in which error correction processing is performed not an output from the second error processing unit 22*d*.

In this manner, according to the second embodiment, also, it is possible to switch error processing modes according to the error rate (signal quality) of the received signal during a system operation, so that it becomes also possible to improve the efficiency of the use of power sources while securing the received signal quality satisfying a demand.

[C] Third Embodiment

Figure 7:
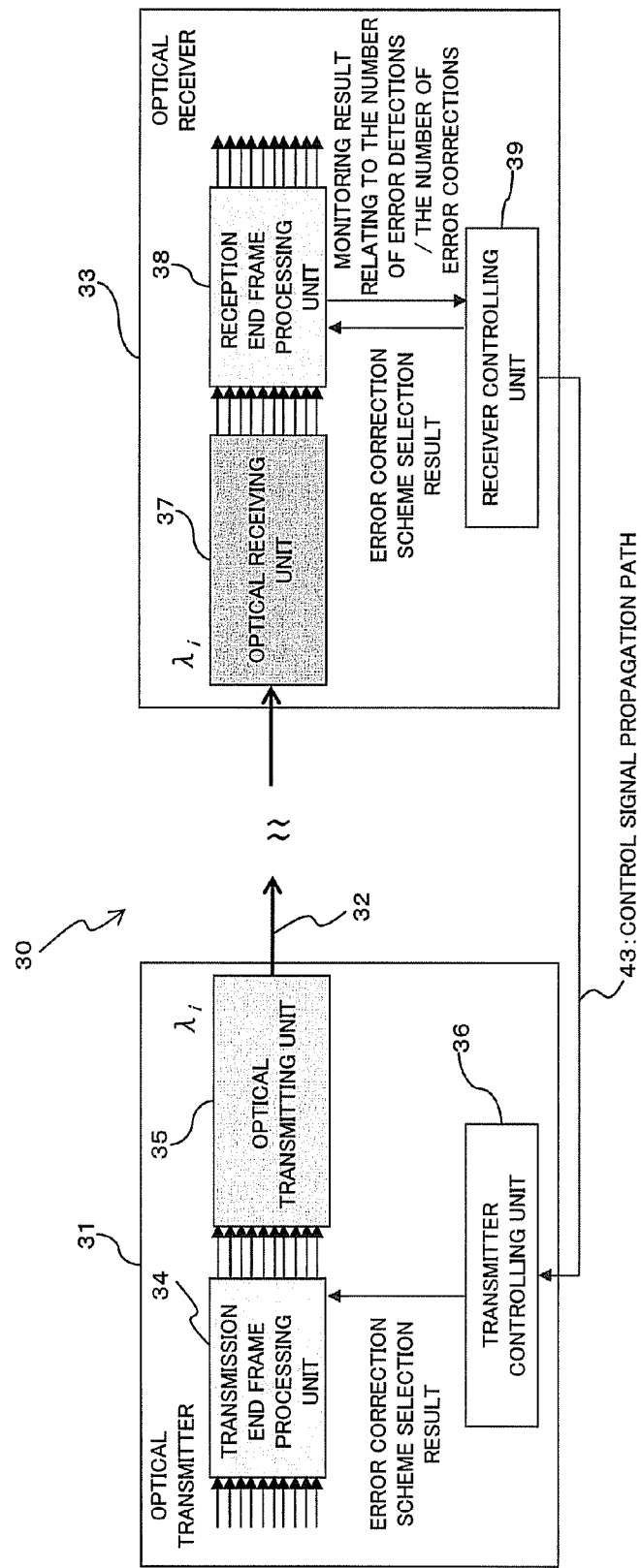
FIG. 7 is a diagram illustrating an optical transmission system according to a third embodiment.

FIG. 7 is a diagram illustrating an optical transmission system 30 according to a third embodiment. In the optical transmission system 30 depicted in FIG. 7, also, an optical transmitter 31 and an optical receiver 33 are coupled by way of an optical transmission path 32 provided with the transmission path fiber and the optical relaying amplifier amplifying and relaying unit or the like similar to those depicted in FIG. 2. Further, the optical transmitter 31 and the optical receiver 33 are also connected to each other by way of the control signal propagation path 43 for transceiving a control signal. In this instance, the optical transmission path 32 in FIG. 7 pays an attention to transmission of an optical signal having a wavelength of λi corresponding to one channel. In FIG. 7, illustration of the wavelength multiplexer 6 and the wavelength demultiplexer 7 or the like is omitted.

The optical transmitter 31 includes: a transmission end frame processing unit 34; an optical transmitting unit 35; and a transmitter controlling unit 36. The transmission end frame processing unit 34 performs transmission end frame processing including coding processing performed in any of the schemes (coding processing modes) under control from the transmitter controlling unit 36. The optical transmitting unit 35 is basically similar to the one (see reference character 4*b*) illustrated in the above described FIG. 2.

The transmitter controlling unit 36 receives a control signal from the optical receiver 33 through the control signal propagation path 43. On the basis of information included in this control signal, more specifically, information relating to the selection result of error correction processing performed on the optical receiver 33 end, the transmitter controlling unit 36 controls coding processing scheme to be performed by the transmission end frame processing unit 34.

Further, the optical receiver 33 includes: an optical receiving unit 37; a reception end frame processing unit 38; and a receiver controlling unit 39. The optical receiving unit 37 is basically similar to the one illustrated in the above described FIG. 2 (see reference character 5*a*). In this instance, the frame processing unit (see reference character 5*b* of FIG. 2) according to the third embodiment includes the receiver controlling unit 39 and the reception end frame processing unit 38.

Here, similar to the cases according to the above described first and second embodiments, the reception end frame processing unit 38 performs frame synchronization processing together with reception end frame processing, including in-frame processing such as, error processing with a designated scheme (error processing mode) of the more than one scheme. In the third embodiment, also, the designable error processing mode can be made to include the processing mode in which error correction processing itself is omitted.

The receiver controlling unit 39 receives information relating to the number of bit errors having been detected or corrected through error processing performed by the reception end frame processing unit 38, and controls designation of the scheme of error processing performed in the reception end frame processing unit 38. More specifically, the receiver controlling unit 39 controls (for example, enable/disable controlling) an operation relating to all or a part of the circuits (see reference characters 38c-i, 38i, and 38n in FIG. 10 and FIG. 12, which will be described below), which performs error processing in each error processing mode, constituting the reception end frame processing unit 38.

Further, the receiver controlling unit 39 transmits a control signal to the transmitter controlling unit 36 by way of the control signal propagation path 43. This control signal includes information relating the error processing scheme controlled in the above described manner. In other words, information relating to the error processing scheme performed by the optical receiver 33 is transmitted from the receiver controlling unit 39 to the transmitter controlling unit 36 through the control signal propagation path 43.

In the above described optical transmission system 30, the transmission end frame processing unit 34 constituting the optical transmitter 31 performs coding processing, and an optical signal is transmitted from the optical transmitting unit 35 to the optical receiver 33 through the optical transmission path 32. Then, the receiver controlling unit 39 of the optical receiver 33 transmits to the transmitter controlling unit 36 through the control signal propagation path 43 switching information about of designation of a necessary error processing mode based on the number of errors detected or corrected by the reception end frame processing unit 38 (that is, based on the error rate induced from the number of errors). The transmitter controlling unit 36, which has received switching information of the designation of an error processing mode, switches the coding processing about a transmission data stream into the coding scheme according to the receiving switching information. The optical receiver 33 transmits switching of the coding scheme in the optical transmitter 31 in this manner, and also switches the error processing mode to be applied to itself.

Figure 8:
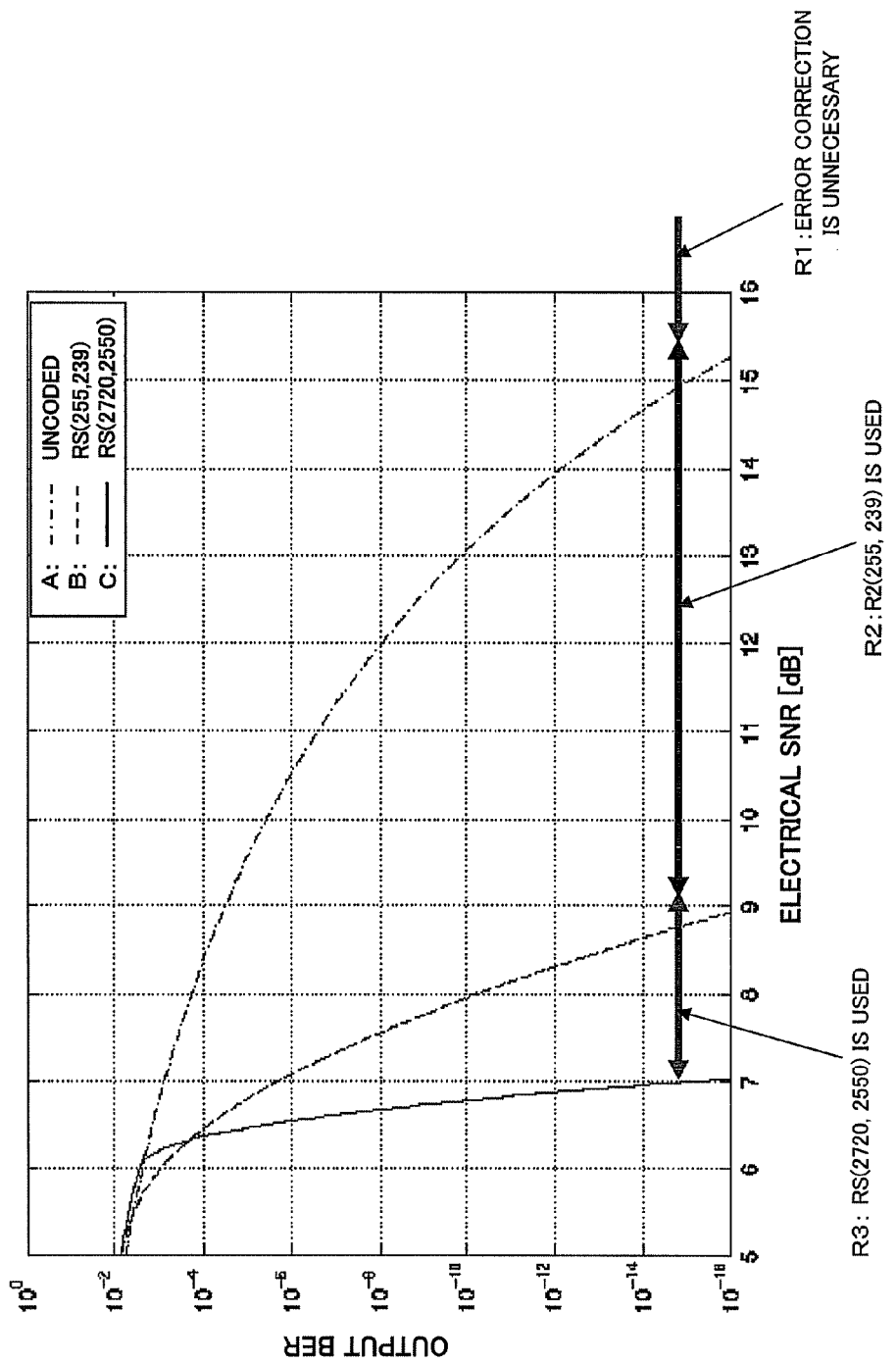
FIG. 8 is a graph for describing a function according to the third embodiment.

FIG. 8 is a graph indicating the output BER to the SNR of the input signal according to the coding schemes described in recommendation G975.1 Appendix in International Telecommunication Union Telecommunication Standardization Sector (ITU-T). Here, line A indicates the case of no coding performed; line B indicates the coding scheme RS (255, 239); line C indicates the coding scheme RS (2720, 2550).

As an example of allocation of the coding schemes (and the corresponding error processing modes) in the optical transmitter 31, as indicted in FIG. 8, three types coding schemes can be allocated in accordance with a range of signal-to-noise ratios (SNRs) associated with the induced error rates. As exemplified in FIG. 8, in a case where the signal-to-noise ratio associated with the induced error rates falls in the first range R1 which indicates the finest signal quality, the scheme that disables coding processing is employed. Further, in a case where the signal-to-noise ratio associated with the induced error rates falls within the second range R2 in which the signal quality is second finest, the coding scheme "RS (255, 239)" is employed. Yet further, in a case where the signal-to-noise ratio falls within the third range R3 in which the signal quality is third finest, the coding scheme "RS (2720, 2550)" is employed.

Figure 9:
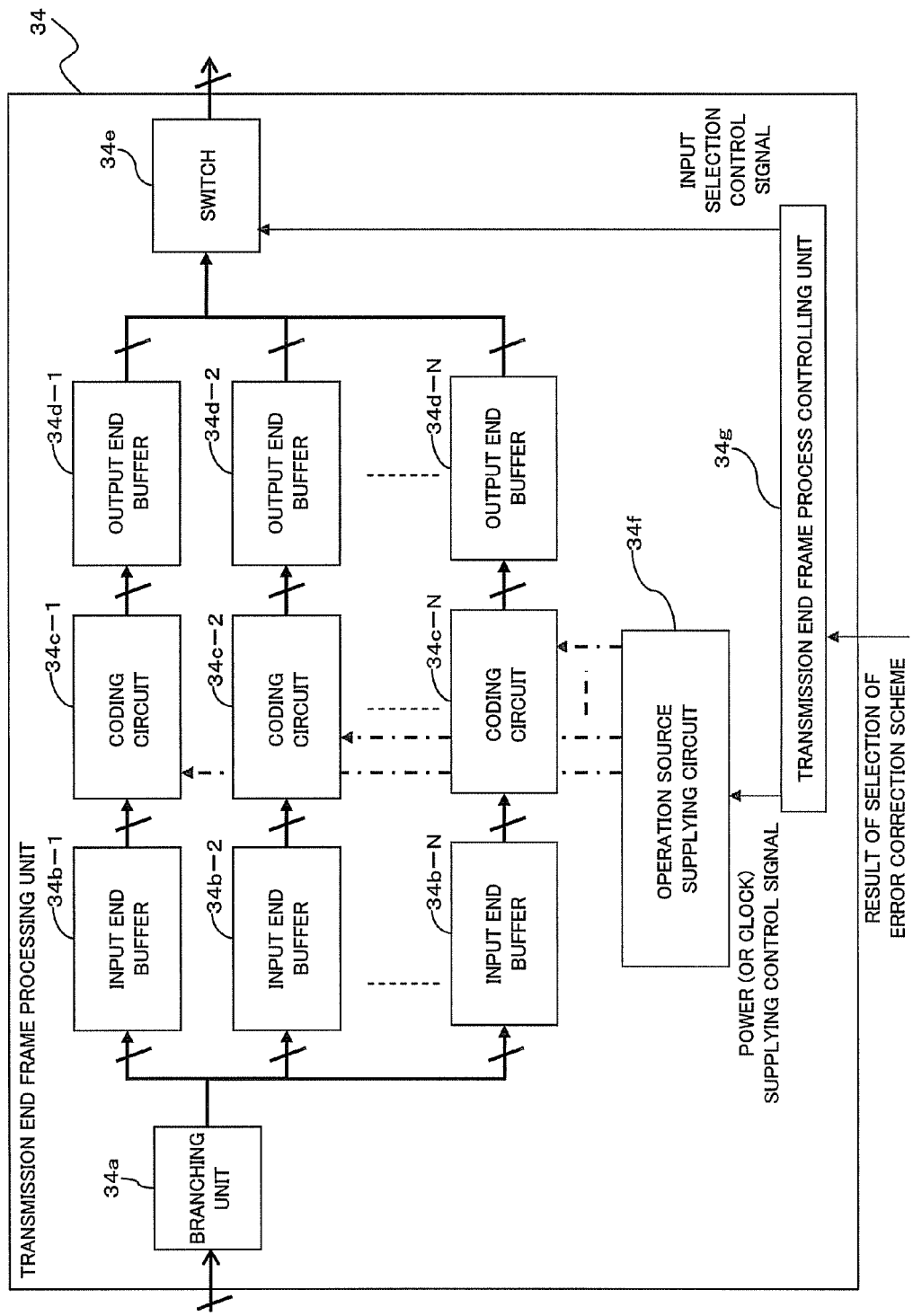
FIG. 9 is a diagram illustrating an example of a transmission end frame processing unit of an optical transmitter according to the third embodiment.
Figure 10:
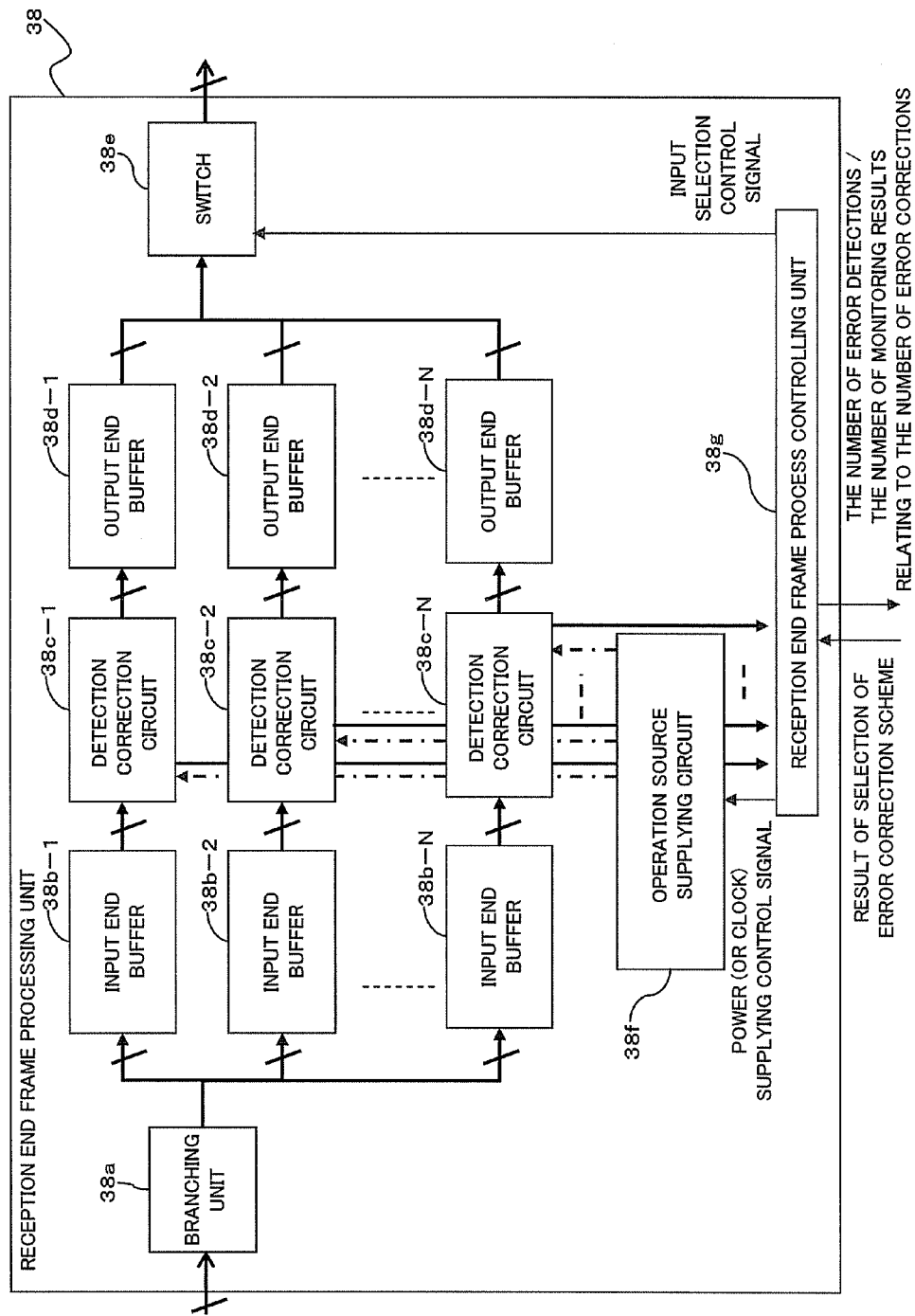
FIG. 10 is a diagram illustrating an example of a reception end frame processing unit of an optical receiver according to the third embodiment.

FIG. 9 and FIG. 10 are examples of the transmission end frame processing unit 34 of the optical transmitter 31 and the reception end frame processing unit 38 of the optical receiver 33, respectively. The transmission end frame processing unit 34 illustrated in FIG. 9 includes: a branching unit 34a; an input end buffer 34b-i (i: 1 through N, N is an integer not smaller than 2); a coding circuit 34c-i; an output end buffer 34d-i; a switch 34e; an operation source supplying circuit 34f; and a transmission end frame processing controlling unit 34g.

In the transmission end frame processing unit 34 illustrated in FIG. 9, the branching unit 34a branches the input data stream for transmission into two or more (here, the N-number of) data streams. The input end buffers 34b-i introduce thereto signals of the data streams for transmission branched by the branching unit 34a and hold the signals therein for the present. Further, each of the N-number of coding circuits 34c-i is input thereto a signal from a single input end buffer 34b-i, and also performs coding processing on the input signal with the coding schemes corresponding to the error correction processing schemes different in correction ability from one another. The signal having been subjected to coding processing by the coding circuit 34c-i is output to the corresponding output end buffer 34d-i.

In this instance, one of the coding schemes in the coding circuit 34c-i can include a scheme in which coding processing itself is not performed (a scheme in which coding processing is disabled). This scheme in which coding processing itself is not performed can be taken as the coding scheme in association with the error correction processing scheme with the lowest error processing ability.

Further, the output end buffers 34d-i hold the signals from the coding circuits 34c-i, and then output the signals to the switch 34e at the same output timing as those of other coding circuit outputs. In other words, the signal holding time duration in each output end buffer 34d-i is adjusted in such a manner that the signal output from the output end buffer 34d-i is output at timing subsequently equal to those of other coding circuits.

The switch 34e receives a selective control signal from the transmission end frame processing controlling unit 34g, and outputs one of the signals from the N-number of output end buffers 34d-i. Further, the operation source supplying circuit 34f receives a supply control signal from the transmission end frame processing controlling unit 34g and supplies the coding circuits 34c-i with an operation source such as power and clock signals.

The transmission end frame processing controlling unit 34g receives information relating to an error correction selection result from the transmitter controlling unit 36. Then, on the basis of the received information, the transmission end frame processing controlling unit 34g controls the selective output of the signal of the switch 34e by a selective control signal, concurrently with controlling the supply of the operation source from the operation source supplying circuit 34f to each coding circuit 34c-i.

More specifically, the transmission end frame processing controlling unit 34g supplies the coding circuit relating to the coding scheme (coding processing mode) corresponding to the received error correction selection result with an operation source by means of performing control over the operation source supplying circuit 34f. On the other hand, the transmission end frame processing controlling unit 34g halts the supply of the operation source to the remaining coding circuits. Further, by means of controlling the switch 34e, the transmission end frame processing controlling unit 34g makes the output end buffer 34d-i, which holds the signal relating to the coding scheme corresponding to the received error correction selection result, selectively output the signal therefrom.

Further, the reception end frame processing unit 38 illustrated in FIG. 10 pays an attention to error processing that works as in-frame processing, and includes: a branching unit 38a; input end buffers 38b-i (i: 1 through N, N is an integer not smaller than 2); a detection correction circuit 38*c-i*; output end buffers 38*d-i*; a switch 38*e*; and an operation source supplying circuit 38*f*; and a reception end frame processing controlling unit 38*g*.

Here, the branching unit 38*a* branches the signal which is input from the optical receiving unit 37 and is subjected to frame synchronization into two or more (the N-number of) signals. Further, each of the input end buffers 38*b-i* introduces thereto the signals branched by the branching unit 38*a* and holds the signals therein for the present. Further, the N-number of detection correction circuits 38*c-i* are error processing circuits which are coupled to the paths to which the signals from the N-number of input end buffers 38*b-i* are output and perform error processing in error processing modes with error correction abilities differs from one another.

In this instance, the processing mode in which error detection is performed but error correction processing is omitted can be included in the processing modes in the detection correction circuit 38*c-i*. The processing mode in which error correction processing is omitted can be taken as a processing mode with the lowest error correction processing ability.

Further, the N-number of output end buffers 38*d-i* are coupled to paths to which the signals having been subjected to the error processing corresponding to the N-number of detection correction circuits 38*c-i* are output, and introduce therein the signals from the corresponding detection correction circuits 38*c-i*, and stores therein the signal for the present. Yet further, the switch 38*e* selectively outputs one of the signals output from the N-number of output end buffers 38*d-i* under switching control of the designation of the error processing mode from the receiver controlling unit 39.

The operation source supplying circuit 38*f* is a supplying circuit which supplies any of the N-number of detection correction circuits 38*c-i* with a circuit operation source such as a clock signal or an operation source under switching control of the designation of the error processing mode from the receiver controlling unit 39 by way of the reception end frame processing controlling unit 38*g*.

The reception end frame processing controlling unit 38*g* receives information relating to an error correction selection result from the receiver controlling unit 39. Then, on the basis of the received information, the reception end frame processing controlling unit 38*g* controls a selection output of a signal in the switch 38*e* and also controls supply of the operation source to each detection correction circuit 38*c-i* by the operation source supplying circuit 38*f*.

More specifically, the reception end frame processing controlling unit 38*g* controls the operation source supplying circuit 38*f* to perform the following operations. That is, the operation source supplying circuit 38*f* supplies the detection correction circuit 38*c-i* corresponding to the designated error processing mode with an operation source such as a clock signal or the like, and halts the supply of the operation source to the remaining detection correction circuit 38*c-i*. Further, the reception end frame processing controlling unit 38*g* controls the switch 38*e* to perform the following operation. That is, the switch 38*e* selectively outputs a signal from the output end buffer 34*d-i* that holds therein a signal relating to the coding scheme corresponding to the error correction selection result received from the receiver controlling unit 39.

In other words, the receiver controlling unit 39 performs switching control of designation of the error processing modes by means of controlling an operation of the detection correction circuit 38*c-i* by way of the reception end frame processing controlling unit 38*g* and the operation source supplying circuit 38*f*. Further, the receiver controlling unit 39 performs switching control of the switch 38*e* by way of the reception end frame processing controlling unit 38*g*.

In the optical transmission system 30 to which the transmission end frame processing unit 34 and the reception end frame processing unit 38 respectively depicted in FIG. 9 and FIG. 10, any of the coding circuits 34*c-i* of the transmission end frame processing unit 34 constituting the optical transmitter 31 performs coding processing, and the resultant optional signal is transmitted from the optical transmitting unit 35 to the optical receiver 33 through the optical transmission path 32. Then, the receiver controlling unit 39 of the optical receiver 33 transmits switching information of the designation of the necessary error processing mode to the transmitter controlling unit 36 through the control signal propagation path 43 based on the number of errors detected or corrected in the detection correction circuit 38*c-i* corresponding to the coding processing performed on the transmission end. Upon reception of the switching information of the designation of the error processing mode, the transmitter controlling unit 36 switches the coding circuits 34*c-i* to be operated through the transmission end frame processing unit 34*g* to the operation source supplying circuit 34*f*. The optical receiver 33 transmits switching of the coding schemes in the optical transmitter 31 in this manner and switches the detection correction circuits 38*c-i* applied thereto, thereby switching the error processing modes.

For example, the optical receiver 33 switches the error processing modes into the one with a lower error correction ability in response to a fine error rate in the signal received by the optical receiver 33. The corresponding processing loads in the coding circuit 34*c-i* and the detection correction circuit 38*c-i* have a tendency such that the higher the error correction ability, the larger the processing load. As a result, it is possible to reduce the processing loads in the coding processing in the transmission end frame processing unit 34 and in error processing in the reception end frame processing unit 38, so that power consumption can be suppressed.

Alternatively, the receiver controlling unit 39 monitors change over time of the error rate induced from the received number of errors. In a case where the error rate develops a tendency to increase and it is necessary to change the correction scheme prior to errors, the receiver controlling unit 39 transmits a switching instruction of the coding scheme to the transmitter controlling unit 36. The receiver controlling unit 39 switches the detection correction circuits 38*c-i* of its own and the switch 38*e* at appropriate timing after the transmission of a switching instruction of the coding scheme to the transmitter controlling unit 36. That is, frame signals to which coding processing has been performed before and after switching, are subjected to error processing in the corresponding detection correction circuit 38*c-i* and output from the switch 38*e*.

In this case, the above mentioned signal holding time duration in each input end buffer 34*b-i* of the transmission end frame processing unit 34 is adjusted in such a manner that the higher the error correction ability of the coding scheme in the coding circuit 34*c-i* coupled thereto, the longer the signal holding time duration. This enables reception frame processing that maintains the required signal quality without a momentary break of the frame signal even in a case where the coding scheme is changed from the coding scheme corresponding to a relatively low error correction ability to the one corresponding to a relatively high error correction ability.

As a concrete example, on the basis of a control signal from the receiver controlling unit 39, a case is assumed in which the coding scheme is switched from the coding circuit 34*c-p* (p:

1 through N) into the coding circuit 34c-q (q: 1 through N but not the value of p) corresponding to the one with a higher error correction ability.

At that time, the input end buffers 34b-p and 34b-q are introduced thereto the signals for coding processing before and after switching at a substantially equal timing, and the setting of the holding time duration of the input end buffer 34b-q is made to be longer than that of the input end buffer 34b-p as follows. That is, the signal holding time duration of the input end buffer 34b-p is a time duration, at least, from when the input end buffer 34b-p is introduced thereto a signal to when the above described feedback for switching the error mode from the optical receiver 33 works.

The input end buffer 34b-q holds a signal introduced from the branching unit 34a during the above mentioned signal holding time duration. This makes it possible to retransmit with the coding scheme changed in the optical transmitter 31a frame signal which is decided not to satisfy the received signal quality required at the time of signal reception of the optical receiver 33. As a result, it becomes possible for the input end buffer 34b-q to perform frame processing while ceaselessly holding the received signal quality with respect to the frame signals sequentially input to the reception end frame processing unit 38.

In this instance, the frame processing unit 22 (see FIG. 5) according to the above described second embodiment can be taken as a mode of the reception end frame processing unit 38 depicted in the above described FIG. 10. That is, both the first and the second error processing units 22c and 22d depicted in FIG. 5 are equivalent to a function unit in which the reception end frame processing unit 38, the operation source supplying circuit 38f, and the corresponding detection correction circuit 38c-i cooperate with one another. Further, the first buffer 22b and the second buffer 22e are equivalent to the input end buffer(s) 38b-i and the output end buffer(s) 38d-i respectively. Further, it can be taken that the input end buffer 38b-i with the minimum delay time (0) is present between the branching unit 22a and the second error processing unit 22d without a buffer interposed therebetween. Likewise, it can be also taken that the output end buffer 38d-i with the minimum delay time (0) is present between the first error processing unit 22c and the switch 22f.

Figure 11:
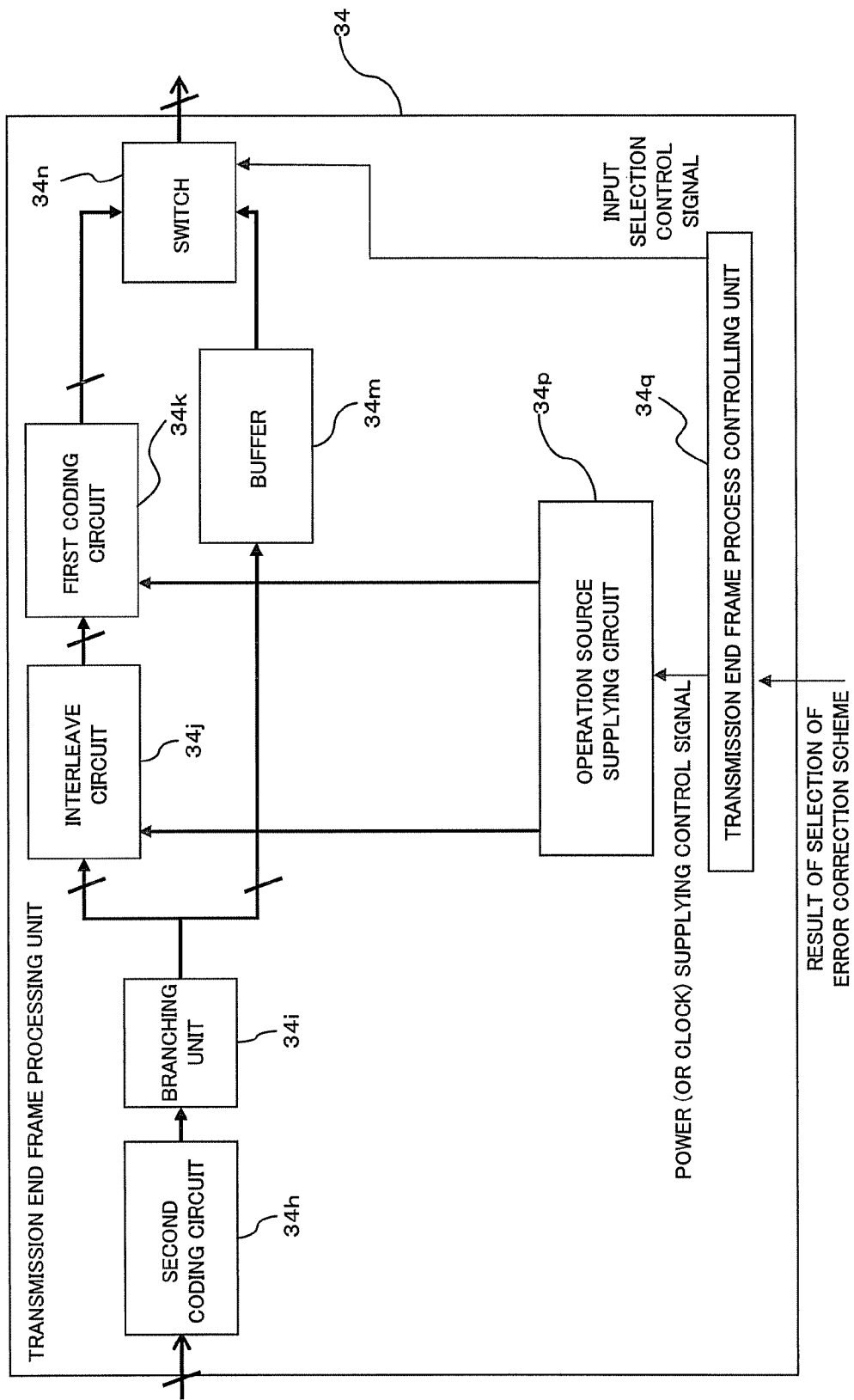
FIG. 11 is another diagram illustrating another example of a transmission end frame processing unit of the optical transmitter according to the third embodiment.
Figure 12:
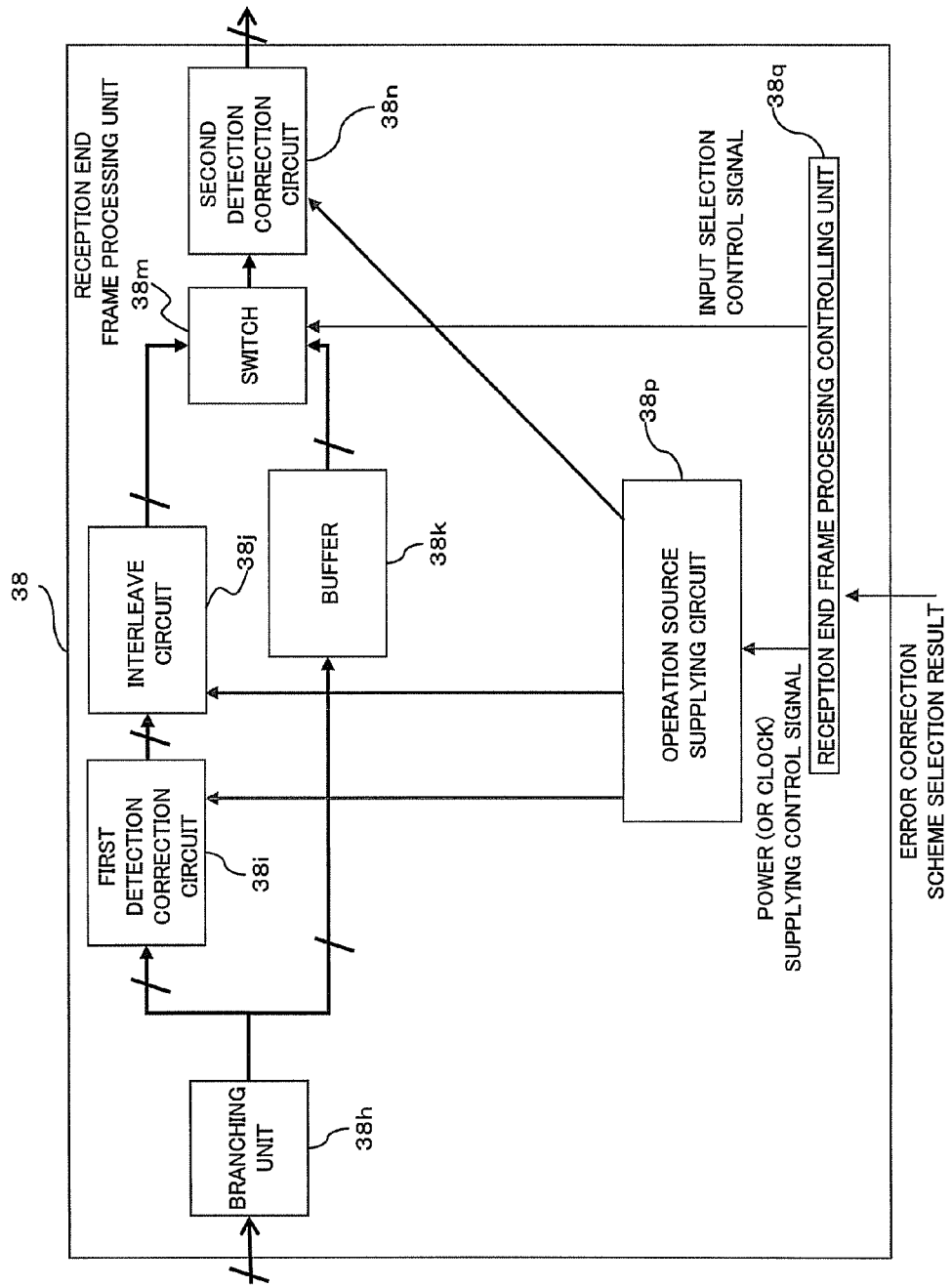
FIG. 12 is a diagram illustrating another example of a reception end frame processing unit of a reception end frame processing unit of the optical receiver according to the third embodiment.

FIG. 11 and FIG. 12 illustrate another example of the transmission end frame processing unit 34 of the optical transmitter 31 and the reception end frame processing unit 38 of the optical receiver 33. The transmission end frame processing unit 34 illustrated in FIG. 11 includes: a second coding circuit 34h; a branching unit 34i; an interleave circuit 34j; a first coding circuit 34k; a buffer 34m; a switch 34n; an operation source supplying circuit 34p; and a transmission end frame processing controlling unit 34q.

The second coding circuit 34h performs coding processing based the second error correction symbol with respect to the input transmission data stream. Further, the branching unit 34i branching the signal from the second coding circuit 34h. Yet further, the interleave circuit 34j performs interleave processing (transmission end interleave processing) with respect to either of the signals bifurcated by the branching unit 34i. The first coding circuit 34k performs coding processing based on the first error correction symbol with respect to the output from the interleave circuit 34j, and then outputs the coding processing result to the switch 34n.

The buffer 34m delays the other of the signals bifurcated by the branching unit 34i, and then outputs the delayed signal at timing equal to the output timing from the above described first coding circuit 34k. Upon reception of a selective controlling signal, the switch 34n selectively outputs either the output from the above mentioned first coding circuit 34k or the output from the buffer 34m.

Further, under designation control of an error processing mode from the transmitter controlling unit 36 by way of the receiver controlling unit 39 and the control signal propagation path 43, the transmission end frame processing controlling unit 34q controls the operations of the interleave circuit 34j and the first coding circuit 34k through the operation source supplying circuit 34p, which will be described below, together with controlling of switching of the switch 34n by the above described selective control signal.

Upon reception of control from the transmission end frame processing controlling unit 34q, the operation source supplying circuit 34p performs ON/OFF control of the supply of an operation source such as a clock signal and a power source with respect to the interleave circuit 34j and the first coding circuit 34k.

For example, in a case where the transmission end frame processing unit 34 performs coding processing by use of both the first and the second error correction symbols, the operation source supplying circuit 34p performs ON-control on the supply of the operation source such as a clock signal or the like with respect to the interleave circuit 34j and the first coding circuit 34k. In this case, the switch 34n outputs a signal from the first coding circuit 34k in response to a selective control signal from the transmission end frame processing controlling unit 34q.

On the other hand, in a case where the transmission end frame processing unit 34 performs coding processing by use of the second error correction symbol without using the first error correction symbol, the transmission end frame processing unit 34 performs OFF-control of the supply of the operation source such as a clock signal to the interleave circuit 34j and the first coding circuit 34k. In this case, the switch 34n outputs the signal from the buffer 34m due to a selective control signal from the transmission end frame processing controlling unit 34q.

The reception end frame processing unit 38 illustrated in FIG. 12 performs frame synchronization processing and in-frame processing. This reception end frame processing unit 38 pays an attention to error processing that is in-frame processing, and performs the reception end frame processing corresponding to the transmission end frame processing in the transmission end frame processing unit 34 depicted in the above mentioned FIG. 11. Because of this, the reception end frame processing unit 38 includes: a branching unit 38h; a first detection correction circuit 38i; an interleave circuit 38j; a buffer 38k; a switch 38m; a second detection correction circuit 38n; an operation source supplying circuit 38p; and a reception end frame processing controlling unit 38q.

The branching unit 38h bifurcates an input signal on which the frame synchronization processing has been performed by the reception end frame processing unit 38. Further, the first detection correction circuit 38i is an example of the first error processing circuit which performs error processing based on the first error correction symbol used in coding performed by the first coding circuit 34k.

Further, the interleave circuit 38j performs interleave processing (reception end interleave processing) relating to the output from the first detection correction circuit 38i, restores the signal on which transmission end interleave processing has been performed by the interleave circuit 34j on the transmission end, and then outputs the restored signal to the switch 38m. The interleave processing performed by the first detection correction circuit 38i can be taken as de-interleave processing with respect to the interleave processing performed in the interleave circuit 34j.

Further, the buffer 38k, which is coupled to the other signal path bifurcated by the branching unit 38h, delays the other signal from the branching unit 38h and outputs the signal to the switch 38m at output timing equal to that of the output from the interleave circuit 38j. Upon reception of switching control of the designation of the error processing mode from the receiver controlling unit 39 (see FIG. 7), the switch 38m selectively outputs either the output from the interleave circuit 38j or the output from the buffer 38k.

Further, the second detection correction circuit 38n is an example of the second error processing circuit which performs error processing based on the second error correction symbol used in coding performed by the second coding circuit 34h with respect to the output from the switch 38m.

Further, the reception end frame processing controlling unit 38q is in charge of the switching operation corresponding to the designation control of the error processing mode from the receiver controlling unit 39. That is, the reception end frame processing controlling unit 38q controls the operation of the first detection correction circuit 38i and the interleave circuit 38j through the operation source supplying circuit 38p under the designation control from the receiver controlling unit 39, and also controls switching of the switch 38m by means of a selective control signal.

The operation source supplying circuit (supplying circuit) 38p controls supply of the operation source with respect to both or either of the first detection correction circuit 38i and the second detection correction circuit 38n. More specifically, under control of the above reception end frame processing controlling unit 38q the operation source supplying circuit 38p can perform ON/OFF control on the supply of an operation source such as a clock signal with respect to the first detection correction circuit 38i and the interleave circuit 38j and on the supply of an operation source to the second detection correction circuit 38n.

That is, the receiver controlling unit 39 can designate two or more types (in this case, four types including the processing mode in which both of the error correction processing is omitted) of error processing mode with error correction abilities different from one another through the combinations of ON/OFF of the first and the second detection correction circuits 38i and 38n (in which the error correction processing in both the first and the second detection correction circuits 38i and 38n???)).

In this manner, according to the third embodiment, also, it is possible to switch error processing modes according to the error rate (signal quality) of the received signal during a system operation, so that it becomes also possible to improve the efficiency of use of power sources while securing the received signal quality satisfying a demand.

As the above described monitoring result relating to the number of bit errors, for example, the following can be used, for example: (1) the number of bit errors; (2) bit error rate; (3) symbol error rate; (3) Q value (including calculation from the transmission error rate or measurement of the Q value of the received light by use of Q monitor); (4) the average number of bit errors per unit time duration; (5) the average bit error rate per unit time duration; (and/or どっち?) (6) the average coding error rate per unit time duration.

The above-described relating monitoring result is considerable as to other than that described above, and is included in the above mentioned in (1) through (6).

[D] Fourth Embodiment

Figure 13:
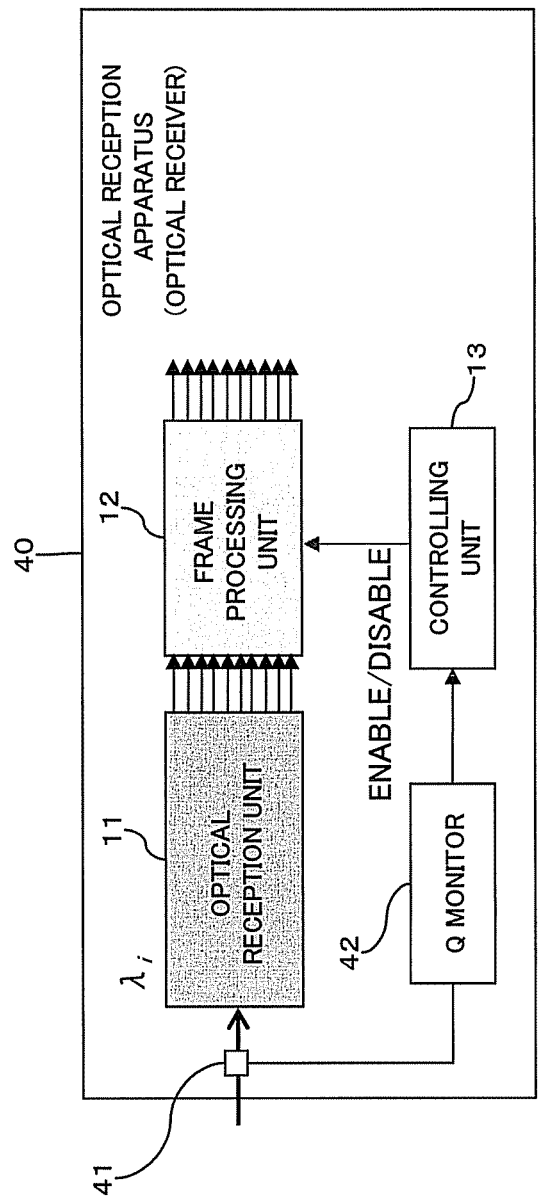
FIG. 13 is a diagram illustrating an optical reception apparatus according to a fourth embodiment.

FIG. 13 is a diagram illustrating an optical reception apparatus (optical receiver) 40 according to a fourth embodiment.

The optical reception apparatus 40 depicted in FIG. 13 is also applicable to, for example, the optical receiver 5 constituting the optical transceivers 8A and 8B in the optical transmission system 1 illustrated in FIG. 2. The optical reception apparatus 40 depicted in FIG. 13 includes: an optical reception unit 11; a frame processing unit 12; and a controlling unit 13; an optical coupler 41; and a Q monitor 42.

The optical coupler 41 is an example of an optical branching unit which bifurcates an optical signal input thereto and outputs one of the bifurcated optical signal to the optical reception unit 11 and the other, to the Q monitor 42.

The optical reception unit 11 outputs the optical signal input from the optical coupler 41 and then outputs the received signal in the form of an electric signal. Further, the frame processing unit 12 performs frame processing on the received signal (input signal) from the optical reception unit 11. Then, the controlling unit 13 designates the error processing mode at the time of frame processing performed in the frame processing unit 12. In this instance, as the optical reception unit 11 and the frame processing unit 12, the ones which are similar to those in the first embodiment can be used.

The Q monitor 42 is an example of a signal quality index value monitor that monitors the index value relating to the signal quality with respect to the input signal which is input to the frame processing unit 12. That is, the Q monitor 42 monitors the Q value with respect to the optical signal input from the optical coupler 41 and then outputs the monitoring result to the controlling unit 13. In this instance, as the Q monitor 42, the one, which is described in Japanese Patent Publication No. 3574578 (in particular, paragraphs 0045, 0069 through 0077, and relating figures thereto), can be used as an example thereof.

With this arrangement, the controlling unit 13 receives the Q value, as a monitoring result relating to bit errors, from the Q monitor 42, and on the basis of the received Q value, the controlling unit 13 controls switching of the designation of the error processing mode following the case according to the first embodiment. In this case, the controlling unit 13 controls the frame processing unit 12 into the processing mode in which error correction processing is disabled when the standard indicating fine signal quality is satisfied by threshold value evaluation about the received Q value, while controlling the frame processing unit 12 into a processing mode in which error correction processing is enabled when the above mentioned standard is not satisfied. In this instance, a mode in which the error processing modes are switched based on the Q value can be modified in various manners in accordance with the mode of each embodiment described above.

As described above, according to the fourth embodiment, it is possible to switch the error processing modes according to the Q value (signal quality) of the input signal input to the frame processing unit 12 during an operation of the system. As a result, it also becomes possible to improve the efficiency of the use of power source while securing the received signal quality satisfying a demand.

All examples and conditional language recited herein are intended for pedagogical purposes to aid the reader in understanding the principles of the invention and the concepts contributed by the inventor(s) to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the gist and scope of the invention.

What is claimed is:

1. A frame processing apparatus, comprising:
a plurality of circuits operable to constitute a plurality of error processing units whose power consumptions are different from each other, the plurality of error processing units corresponding to a plurality of error processing modes whose error correction processing abilities are different from each other, respectively, each of the plurality of error processing units adapted to perform frame processing of an input signal according to the error processing mode corresponding to the unit; and
a processor which performs switching designation of the error processing modes so that the error processing unit corresponding to the designation performs the frame processing, based on signal quality of the input signal.

2. The frame processing apparatus as set forth in claim 1,
wherein one of the plurality of error processing units performs the frame processing of the input signal under a state in which one of a plurality of error processing modes, each having different error correction abilities, is designated; and
wherein the processor performs switching the designation of the error processing modes based on the number of bit errors that are detected or corrected at the frame processing.

3. The frame processing apparatus as set forth in claim 2, wherein the processor performs switching to an error processing mode, out of the plurality of error processing modes, which has an error correction ability according to an error occurrence rate derived from the number of bit errors.

4. The frame processing apparatus as set forth in claim 2, wherein the error processing modes include a mode in which error correction processing is disabled.

5. The frame processing apparatus as set forth in claim 4, wherein one of the plurality of error processing units outputs the number of bit errors detected or corrected at the error correction processing performed in a case where the error correction processing is performed under the designated error processing mode, while one of the plurality of error processig units detects the number of bit errors and outputs the detection result to the processor in a case where the error correction processing disabled under the designated error processing mode.

6. The frame processing apparatus as set forth in claim 2, further comprising:
a branching unit which multi-branches the input signal;
a plurality of input end buffers to which individual signals branched by the branching unit are introduced, respectively;
a plurality of error processing circuits coupled to individual paths to which signals from the plurality of input end buffers are output, respectively, which the plurality of error processing circuits perform error processing under error processing modes each having different error correction abilities;
a plurality of output end buffers coupled to individual paths in the plurality of error processing circuits, to which paths signals, having been subjected to the corresponding error processing in the plurality of error processing circuits, are output; and
a switch which selectively outputs one of the signals output from the plurality of output end buffers in response to switching control on designation of the error processing mode designated by the processor, wherein
the error processing circuits constitute the error processing units, respectively.

7. The frame processing apparatus as set forth in claim 6, further comprising: a supply unit which supplies one of the plurality of error processing circuits with an operation source upon reception of switching control with respect to designation of the error processing mode designated by the processor.

8. The frame processing apparatus as set forth in claim 6,
wherein in each of the plurality of input end buffers, the higher error correction ability of the error processing circuit coupled thereto, the longer the signal holding time, and
wherein each of the plurality of output end buffers performs frame synchronization of the signals output to the switch before and after the switching of the designation.

9. The frame processing apparatus as set forth in claim 2, further comprising:
a branching unit which bifurcates the input signal;
a first error processing circuit which performs error processing of one of the signals bifurcated by the branching unit based on a first error correction code;
an interleaver which performs interleave processing of an output from the first error processing circuit;
a buffer coupled to a signal path for the other signal bifurcated by the branching unit;
a switch which selectively outputs either the signal output from the interleaver or the signal output from the buffer in response to switching control on designation of the error processing mode designated by the processor;
a second error processing circuit which performs error processing of an output of the switch based on a second error correction code; and
a supply unit which controls supply of an operation source to the first error processing circuit and/or the second error processing circuit in response to the switching control by the processor for designation of the error processing mode,
wherein:
the first error processing circuit and the second error processing circuit constitute a first error processing unit in a case that the switch outputs the signal output from the interleaver; and
the second error processing circuit constitutes a second error processing unit in a case that the switch outputs the signal output from the buffer.

10. The frame processing apparatus as set forth in claim 1, further comprising:
a signal quality index value monitor which monitors an index value relating to signal quality of an input signal,
the processor receiving a monitoring result obtained by the signal quality index value monitor, and performing switching control that switches designation of the error processing modes, based on the received monitoring result.

11. A frame processing apparatus, comprising:
a branching unit which bifurcates a input signal;
an error detecting circuit which detects a bit error with respect to either of the signals bifurcated by the branching unit;
an error correcting circuit which performs error correction processing together with detection of the bit error with respect to the other signal bifurcated by the branching unit;
a switch which selectively outputs either a signal in which the bit error is detected by the error detecting circuit or a signal subjected to the error correction processing performed by the error correcting circuit; and
a processor which performs control such that either one of the error detecting circuit and the error correcting circuit is enabled and the other is disabled based on the number of bit errors which is obtained from detection performed by the error correcting circuit, detection by the error correcting circuit, or error correction processing performed by the error correcting circuit, and performs switching control such that an output signal from the switch is made to be a signal from the circuit controlled to be enabled.

12. The frame processing apparatus as set forth in claim 11, further comprising:

a first buffer interposed between the branching unit and the error correcting circuit; and a second buffer interposed between the error detecting circuit and the switch.

13. An optical receiving apparatus, comprising:

an optical receiving unit which receives an incoming optical signal and outputs the signal as an electric signal;

a plurality of circuits operable to constitute a plurality of error processing units whose power consumptions are different from each other, the plurality of error processing units corresponding to a plurality of error processing modes whose error correction processing abilities are different from each other, respectively, each of the plurality of error processing units adapted to perform frame processing of an input signal from the optical receiving unit according to the error processing mode corresponding to the unit; and a processor which performs switching designation of the error processing modes so that the error processing unit corresponding to the designation performs the frame processing, based on signal quality of the input signal.

14. An optical transceiving apparatus, comprising:

an optical transmitter which sends an optical signal; and an optical receiver which receives an optical signal, the optical receiver comprising:

an optical receiving unit which receives an incoming optical signal and outputs the signal as an electric signal;

a plurality of circuits operable to constitute a plurality of error processing units whose power consumptions are different from each other, the plurality of error processing units corresponding to a plurality of error processing modes whose error correction processing abilities are different from each other, respectively, each of the plurality of error processing units adapted to perform frame processing of an input signal from the optical receiving unit according to the error processing mode corresponding to the unit; and a processor which performs switching designation of the error processing modes so that the error processing unit corresponding to the designation performs the frame processing, based on signal quality of the input signal.

15. An optical transmission system, comprising:

an optical transmitter which performs transmission end frame processing under a transmission end error processing mode designated with respect to incoming data traffic, and converts the transmission end frame processed signal into an optical signal and sends the optical signal; and an optical receiver which receives an optical signal sent from the optical transmitter, the optical receiver comprising:

an optical receiving unit which receives an incoming optical signal and outputs the signal as an electric signal;

a plurality of circuits operable to constitute a plurality of error processing units whose power consumptions are different from each other, the plurality of error processing units corresponding to a plurality of error processing modes whose error correction processing abilities are different from each other, respectively, each of the plurality of error processing units adapted to perform reception end frame processing of an input signal from the optical receiving unit according to the error processing mode corresponding to the unit; and a processor which performs switching designation of the reception end error processing modes so that the error processing unit corresponding to the designation performs the reception end frame processing, based on signal quality of the input signal, and sends control information relating to designation of the reception end processing mode, the optical transmitter comprising:

a processor which performs switching the designation of the transmission end error processing modes, based on the control information from the optical receiver.

16. A controlling method of frame processing which performs frame processing including error processing of an input signal, for a frame processing apparatus, the controlling method comprising:

receiving a monitoring result relating to signal quality of the input signal, the frame processing apparatus including a plurality of circuits operable to constitute a plurality of error processing units whose power consumptions are different from each other, the plurality of error processing units corresponding to a plurality of error processing modes whose error correction processing abilities are different from each other, respectively, each of the plurality of error processing units adapted to perform frame processing of the input signal according to a designated error processing mode corresponding to the unit; and performing switching designation of the error processing modes so that the error processing unit corresponding to the designation performs the frame processing, based on the monitoring result relating to the signal quality of the input signal.

* * * * *

UNITED STATES PATENT AND TRADEMARK OFFICE
CERTIFICATE OF CORRECTION

| | | |
|---|---|---|
| PATENT NO. | : 8,649,678 B2 | Page 1 of 1 |
| APPLICATION NO. | : 12/488745 | |
| DATED | : February 11, 2014 | |
| INVENTOR(S) | : Hoshida et al. | |

It is certified that error appears in the above-identified patent and that said Letters Patent is hereby corrected as shown below:

In the Claims

Column 21, Line 40, In Claim 5, delete "processig" and insert -- processing --, therefor.

Signed and Sealed this
Twenty-seventh Day of May, 2014

Michelle K. Lee
*Deputy Director of the United States Patent and Trademark Office*